US011799295B2

(12) United States Patent
Dall'Anese et al.

(10) Patent No.: US 11,799,295 B2
(45) Date of Patent: *Oct. 24, 2023

(54) REAL TIME FEEDBACK-BASED OPTIMIZATION OF DISTRIBUTED ENERGY RESOURCES

(71) Applicants: Alliance for Sustainable Energy, LLC, Golden, CO (US); Université catholique de Louvain, Louvain-la-Neuve (BE)

(72) Inventors: Emiliano Dall'Anese, Arvada, CO (US); Andrey Bernstein, Golden, CO (US); Andrea Simonetto, Wavre (BE)

(73) Assignees: Alliance for Sustainable Energy, LLC, Golden, CO (US); Universite Catholique de Louvain, Louvain-la-Neuve (BE)

( * ) Notice: Subject to any disclaimer, the term of this patent is extended or adjusted under 35 U.S.C. 154(b) by 329 days.

This patent is subject to a terminal disclaimer.

(21) Appl. No.: 17/168,810

(22) Filed: Feb. 5, 2021

(65) Prior Publication Data

US 2021/0184470 A1    Jun. 17, 2021

Related U.S. Application Data

(63) Continuation of application No. 16/681,054, filed on Nov. 12, 2019, now Pat. No. 10,944,267, which is a
(Continued)

(51) Int. Cl.
*H02J 3/38* (2006.01)
*H02J 3/32* (2006.01)
(Continued)

(52) U.S. Cl.
CPC ............ *H02J 3/381* (2013.01); *G05B 19/042* (2013.01); *H02J 3/32* (2013.01); *H02J 3/46* (2013.01);
(Continued)

(58) Field of Classification Search
CPC ...... H02J 3/381; H02J 3/32; H02J 3/46; H02J 3/00; H02J 2203/20; G05B 19/042;
(Continued)

(56) References Cited

U.S. PATENT DOCUMENTS 6,968,905 B2    11/2005  Adnan et al.
7,337,256 B2     2/2008  Korowitz et al.
(Continued)

FOREIGN PATENT DOCUMENTS

| JP | 4025095 | 12/2007 |
| WO | 2016/004433 A1 | 7/2016 |
| WO | 2016/176775 A1 | 11/2016 |

OTHER PUBLICATIONS

Dall'Anese et al, "Distributed Optimal Power Flow for Smart Microgrids", Jan. 2014, pp. 1-11, downloaded from https://arxiv.org/pdf/1211.5856.pdf (Year: 2014).*

(Continued)

*Primary Examiner* — Christopher E. Everett
*Assistant Examiner* — Olvin Lopez Alvarez
(74) *Attorney, Agent, or Firm* — Robert G. Pittelkow

(57) ABSTRACT

An example device includes a processor configured to receive a plurality of voltage values representing respective voltage magnitudes at voltage nodes in a first portion of a power system and determine, for each voltage node, a respective value of first and second voltage-constraint coefficients. The processor is also configured to receive a power value corresponding to a connection point of the first portion of the power system with a second portion of the power (Continued)

system and determine for the connection point, a respective value of first and second power-constraint coefficients. The processor is also configured to cause at least one energy resource connected to the first portion of the power system to modify an output power of the at least one energy resource based on the value of the first and second voltage-constraint coefficients for each voltage node and the value of the first and second power-constraint coefficients.

32 Claims, 5 Drawing Sheets

Related U.S. Application Data continuation of application No. 15/814,532, filed on Nov. 16, 2017, now Pat. No. 10,516,269.

(51) Int. Cl.
  H02J 3/46    (2006.01)
  G05B 19/042  (2006.01)
  H02J 3/00    (2006.01)

(52) U.S. Cl.
  CPC ......... G05B 2219/2639 (2013.01); H02J 3/00 (2013.01); H02J 2203/20 (2020.01); Y02E 40/70 (2013.01); Y02E 60/00 (2013.01); Y04S 40/20 (2013.01)

(58) Field of Classification Search
  CPC ......... Y02E 40/70; Y02E 60/00; Y04S 40/20; Y04S 10/12; Y04S 10/50
  See application file for complete search history.

(56) References Cited

U.S. PATENT DOCUMENTS

| | | | |
|---|---|---|---|
| 7,920,942 B2 | 4/2011 | Lasseter et al. |
| 7,932,637 B2 | 4/2011 | Lasseter et al. |
| 8,446,040 B2 | 5/2013 | Paik et al. |
| 8,447,434 B1 | 5/2013 | Harris et al. |
| 8,606,372 B1 | 12/2013 | Harris et al. |
| 8,649,914 B2 | 2/2014 | Miller et al. |
| 8,676,219 B2 | 3/2014 | Pratt, Jr. et al. |
| 8,760,004 B2 | 6/2014 | Weale |
| 8,761,953 B2 | 6/2014 | Friedrich et al. |
| 8,825,218 B2 | 9/2014 | Cherian et al. |
| 8,886,362 B2 | 11/2014 | Krok et al. |
| 9,086,228 B2 | 7/2015 | Morimoto |
| 9,280,797 B2 | 3/2016 | Ekanayake et al. |
| 9,293,920 B2 | 3/2016 | McMullin |
| 9,300,137 B2 | 3/2016 | Cherian et al. |
| 9,372,478 B2 | 6/2016 | Ridenour, III et al. |
| 9,373,960 B2 | 6/2016 | Pande et al. |
| 9,419,437 B2 | 8/2016 | Benosman et al. |
| 9,496,754 B2 | 11/2016 | Kulathu et al. |
| 9,570,909 B2 | 2/2017 | Milosevic et al. |
| 9,733,623 B2 | 8/2017 | Yang et al. |
| 9,762,060 B2 | 9/2017 | Kalsi et al. |
| 9,811,068 B2 | 11/2017 | Sharma et al. |
| 9,843,506 B2 | 12/2017 | Saegusa et al. |
| 9,847,644 B2 | 12/2017 | Muller et al. |
| 9,865,024 B2 | 1/2018 | Mokhtari et al. |
| 9,866,170 B2 | 1/2018 | Yang et al. |
| 9,887,531 B2 | 2/2018 | Oudalov et al. |
| 9,899,839 B2 | 2/2018 | Gersch et al. |
| 9,912,158 B2 | 3/2018 | Ravikumar et al. |
| 9,960,601 B2 | 5/2018 | Matan et al. |
| 9,960,637 B2 | 5/2018 | Sanders et al. |
| 10,082,778 B2 | 9/2018 | Kohn et al. |
| 10,116,164 B2 | 10/2018 | Srivastava et al. |
| 10,135,247 B2 | 11/2018 | Fisher et al. |
| 10,148,092 B2 | 12/2018 | Dall+3 Anese et al. |
| 10,152,076 B2 | 12/2018 | Aggarwal et al. |
| 10,177,574 B2 | 1/2019 | Guo et al. |
| 10,230,239 B2 | 3/2019 | Feng et al. |
| 2004/0051387 A1 | 3/2004 | Lasseter et al. |
| 2006/0276938 A1 | 12/2006 | Miller et al. |
| 2008/0077368 A1 | 3/2008 | Nasle |
| 2009/0319090 A1 | 12/2009 | Dillon et al. |
| 2011/0015801 A1 | 1/2011 | Mazzarella et al. |
| 2012/0029897 A1 | 2/2012 | Cherian et al. |
| 2013/0018517 A1 | 1/2013 | Kalagnanam et al. |
| 2013/0184889 A1 | 7/2013 | Fan et al. |
| 2013/0297089 A1 | 11/2013 | Fu et al. |
| 2014/0062426 A1 | 3/2014 | Yang et al. |
| 2014/0309753 A1 | 10/2014 | Crepet |
| 2015/0005970 A1 | 1/2015 | Zweigle et al. |
| 2015/0134280 A1 | 5/2015 | Narayan et al. |
| 2015/0377936 A1 | 12/2015 | Ghosh et al. |
| 2016/0004228 A1 | 1/2016 | Kohn et al. |
| 2016/0013652 A1 | 1/2016 | Li et al. |
| 2016/0087434 A1 | 3/2016 | Matan et al. |
| 2016/0087440 A1 | 3/2016 | Matan et al. |
| 2016/0179077 A1 | 6/2016 | Le Boudec et al. |
| 2016/0259314 A1 | 9/2016 | Dhople et al. |
| 2016/0315807 A1 | 10/2016 | Peng et al. |
| 2017/0092055 A1 | 3/2017 | Brockman et al. |
| 2017/0264212 A1 | 9/2017 | Muguerza Olcoz et al. |
| 2017/0270548 A1 | 9/2017 | Sun |
| 2017/0271877 A1 | 9/2017 | Stewart et al. |
| 2018/0048157 A1 | 2/2018 | Kolwalkar et al. |
| 2018/0109137 A1 | 4/2018 | Bhageria et al. |
| 2018/0138711 A1 | 5/2018 | Dall'Anese et al. |
| 2018/0152020 A1 | 5/2018 | Kuroda et al. |
| 2018/0219382 A1 | 8/2018 | Nelson et al. |
| 2018/0226799 A1 | 8/2018 | Baker et al. |
| 2018/0366978 A1 | 12/2018 | Matan et al. |
| 2019/0020220 A1 | 1/2019 | Lian et al. |
| 2019/0027960 A1 | 1/2019 | Agrawal et al. |
| 2019/0044333 A1 | 2/2019 | Martinez et al. |
| 2020/0083713 A1 | 3/2020 | Dall'Anese et al. |

OTHER PUBLICATIONS

Bank et al., "Development of a High Resolution, Real Time, Distribution-Level Metering System and Associated Visualization, Modeling, and Data Analysis Functions", NREL Technical Report NREL/TP-5500-56610, May 2013, pp. 1-36.

Bernstein et al., "A Composable Method for Real-Time Control of Active Distribution Networks with Explicit Power Setpoints. Part I: Framework", Electric Power Systems Research, Aug. 2015, vol. 125, pp. 254-264.

Bernstein et al., "Feedback-Based Real-Time Optimization of Multiphase Distribution Networks", Presentation to École Polytechnique Fédérate de Lausanne (EPFL), Oct. 3, 2017, available at http://icawww1.epfl.ch/PS_files/Talk_EPFL_AB2017.pdf, pp. 1-50.

Bernstein et al., "Real-Time Feedback-Based Optimization of Distribution Grids: A Unified Approach", Nov. 2017, available at https://arxiv.org/pdf/1711.01627.pdf, pp. 1-11.

Bolognani et al., "Distributed Reactive Power Feedback Control for Voltage Regulation and Loss Minimization", IEEE Transactions on Automatic Control, Apr. 2015, vol. 60, No. 4, pp. 966-981.

Christakou et al., "GECN: Primary Voltage Control for Active Distribution Networks via Real-Time Demand-Response", IEEE Transactions on Smart Grid, Mar. 2014, vol. 5, No. 2, pp. 622-631.

Dall'Anese et al., "Optimal Power Flow Pursuit", IEEE Transactions on Smart Grid, Jan. 27, 2016, pp. 1-11.

Dall'Anese et al., "Photovoltaic Inverter Controllers Seeking AC Optimal Power Flow Solutions", IEEE Transactions on Power Systems, Jul. 2016, vol. 31, No. 4 pp. 2809-2823.

Dall'Anese, "Online Optimization with Feedback for Virtual Power Plants", Presentation, Golden, CO, Aug. 2, 2017, pp. 1-60.

Dall'Anese et al., "Optimal Regulation of Virtual Power Plants", IEEE Transactions on Power Systems, Aug. 2017 DOI 10.1109/TPWRS.2017.2741920, pp. 1-14.

Dhople et al., "Linear Approximations to AC Power Flow in Rectangular Coordinates", Fifty-third Annual Allerton Conference, UIUC, Illinois, Sep. 2015, pp. 211-217.

(56) References Cited

OTHER PUBLICATIONS

Guggilam et al., "Scalable Optimization Methods for Distribution Networks with High PV Integration", IEEE Transactions on Smart Grid, Jul. 2016, vol. 7, No. 4, pp. 2061-2070.

Hauswirth et al., "Projected Gradient Descent on Riemannian Manifolds with Applications to Online Power System Optimization", 54th Annual Allerton Conference on Communication, Control, and Computing, Sep. 2016, pp. 225-232.

Hauswirth et al., "Online Optimization in Closed Loop on the Power Flow Manifold", 12th IEEE PES PowerTech Conference 2017, pp. 1-6.

Jokić et al., "Real-time Control of Power Systems Using Nodal Prices", International Journal of Electrical Power & Energy Systems, Oct. 2009, vol. 31, No. 9, pp. 522-530.

Kersting, Distribution System Modeling and Analysis, Chapter 6, 2nd ed., Boca Raton, FL, CRC Press, 2007, pp. 145-183.

Koshal et al., "Multiuser Optimization: Distributed Algorithms and Error Analysis", Society for Industrial and Applied Mathematics—Journal on Optimization, Sep. 2011, vol. 21, No. 3, pp. 1046-1081.

Reyes-Chamorro et al., "A Composable Method for Real-time Control of Active Distribution Networks with Explicit Power Setpoints. Part II: Implementation and Validation", Electric Power Systems Research, 2015, vol. 125, pp. 265-280.

Simonetto et al., "Double Smoothing for Time-Varying Distributed Multiuser Optimization", IEEE Global Conference an Signal and Information Processing (Global SIP), Dec. 2014, pp. 852-856.

Tang et al., "Real-Time Optimal Power Flow", IEEE Transactions on Smart Grid, Nov. 2017, vol. 8, No. 6, pp. 2963-2973.

International Search Report and Written Opinion for International (PCT) Application No. PCT/US17/61911, dated Aug. 27, 2018, pp. 1-16.

Bernstein et al., "Real-Time Feedback-Based Optimization of Distribution Grids: A Unified Approach", IEEE Transactions on Control of Network Systems, Sep. 2019, vol. 6, No. 3, pp. 1197-1209.

Oliveira et al., "Agrangian Relaxation in Power Flow Problem applied to Large Electrical Systems", 1996, available at http://engopt.org/uploads/86.pdf, pp. 1-10.

Sousa et al., "Robust Optimal Power Flow Solution Using Trust Region and Interior-Point Methods", IEEE Transactions on Power Systems, May 2011, vol. 26, No. 2, pp. 487-499.

\* cited by examiner

REAL TIME FEEDBACK-BASED OPTIMIZATION OF DISTRIBUTED ENERGY RESOURCES

CROSS-REFERENCE TO RELATED APPLICATIONS

This application is a continuation of U.S. application Ser. No. 16/681,054, filed Nov. 12, 2019, which is a continuation of U.S. application Ser. No. 15/814,532, filed Nov. 16, 2017, which, in turn, claims the benefit of U.S. Provisional Application No. 62/422,853, titled "DISTRIBUTION INFRASTRUCTURE OPTIMIZATION AND CONTROL" and filed Nov. 16, 2016, and U.S. Provisional Application No. 62/567,628, titled "DISTRIBUTION INFRASTRUCTURE OPTIMIZATION AND CONTROL" and filed Oct. 3, 2017. The entire content of each listed application is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

As renewable energy becomes more important in today's society, power grids may have to manage increasingly distributed energy resources. Even modest housing may have photovoltaic (PV) systems and/or wind turbines installed to reduce dependence on the grid, and to offset energy costs. As prevalence of these distributed energy resources increases, grid managers, such as those who manage power distribution networks, will be faced with new challenges in preventing network overload, ensuring satisfaction of engineering limits, and managing power generated by distributed sources.

SUMMARY

The present disclosure provides systems, devices, and methods for power systems such as power distribution grids to manage distributed energy resources (DERs). The techniques described herein may allow a distribution feeder or other power system to emulate a "virtual power plant," effectively providing automatic generation control (AGC) and/or regulation services with respect to particular points in the power system, such as at an interface with a power transmission grid, while addressing DER owners' economic objectives and ensuring satisfaction of engineering limits.

In one example, a device includes at least one processor configured to receive a plurality of voltage values, wherein voltage values in the plurality of voltage values correspond to respective voltage nodes in a plurality of voltage nodes in a first portion of a power system. The at least one processor is also configured to determine, for each respective voltage node, a respective value of a first voltage-constraint coefficient, based on a respective previous value of the first voltage-constraint coefficient, a minimum voltage value, and a respective voltage value in the plurality of voltage values that corresponds to the respective voltage node, and a respective value of a second voltage-constraint coefficient based on a respective previous value of the second voltage-constraint coefficient, a maximum voltage value, and the respective voltage value. The at least one processor is also configured to receive a power value corresponding to a connection point of the first portion of the power system with a second portion of the power system and determine for the connection point, a value of a first power-constraint coefficient, based on a previous value of the first power-constraint coefficient, a power setpoint for the connection point, and the power value, and a value of a second power-constraint coefficient based on a previous value of the second power-constraint coefficient, the power setpoint for the connection point, and the power value. The at least one processor is also configured to cause at least one energy resource in a plurality of energy resources that are connected to the first portion of the power system to modify an output power of the at least one energy resource based on the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

In another example, a system includes a power management system configured to receive, from each of a plurality of voltage measurement devices, a respective voltage value that corresponds to a respective voltage node in a plurality of voltage nodes in a first portion of a power system and receive a power value that corresponds to a connection point at which the first portion of the power system connects to a second portion of the power system. The power management system is further configured to determine, for each respective voltage node in the plurality of voltage nodes, a respective value of a first voltage-constraint coefficient, based on a respective previous value of the first voltage-constraint coefficient, a minimum voltage value, and the respective voltage value, and a respective value of a second voltage-constraint coefficient based on a respective previous value of the second voltage-constraint coefficient, a maximum voltage value, and the respective voltage value. The power management system is further configured to determine, for the connection point, a value of a first power-constraint coefficient, based on a previous value of the first power-constraint coefficient, a power setpoint for the connection point, and the power value, and a value of a second power-constraint coefficient, based on a previous value of the second power-constraint coefficient, the power setpoint for the connection point, and the power value. The power management system is further configured to output the respective value of the first voltage-constraint coefficient for each respective voltage node, the respective value of the second voltage-constraint coefficient for each respective voltage node, the value of the first power-constraint coefficient, and the value of the second power-constraint coefficient. The system further includes a plurality of energy resource management devices, each corresponding to a respective at least one energy resource connected to the power system, each energy resource management device being configured to receive the respective value of the first voltage-constraint coefficient for each respective voltage node, the respective value of the second voltage-constraint coefficient for each respective voltage node, the value of the first power-constraint coefficient, and the value of the second power-constraint coefficient. Each energy resource management device is further configured to determine, based on the respective value of the first voltage-constraint coefficient for each respective voltage node, the respective value of the second voltage-constraint coefficient for each respective voltage node, the value of the first power-constraint coefficient, and the value of the second power-constraint coefficient, a respective power setpoint value, and modify a respective output power of the respective at least one energy resource, based on the respective power setpoint value.

In another example, a method includes receiving, by a power management system comprising at least one processor, a plurality of voltage values, wherein voltage values in the plurality of voltage values correspond to respective voltage nodes in a plurality of voltage nodes in a first portion of a power system. The method also includes determining, by the power management system and for each respective voltage node, a respective value of a first voltage-constraint coefficient, based on a respective previous value of the first voltage-constraint coefficient, a minimum voltage value, and a respective voltage value in the plurality of voltage values that corresponds to the respective voltage node, and a respective value of a second voltage-constraint coefficient based on a respective previous value of the second voltage-constraint coefficient, a maximum voltage value, and the respective voltage value. The method also includes receiving, by the power management system, a power value corresponding to a connection point of the first portion of the power system with a second portion of the power system and determining, by the power management system and for the connection point, a value of a first power-constraint coefficient, based on a previous value of the first power-constraint coefficient, a power setpoint for the connection point, and the power value, and a value of a second power-constraint coefficient based on a previous value of the second power-constraint coefficient, the power setpoint for the connection point, and the power value. The method also includes causing, by the power management system, at least one energy resource in a plurality of energy resources that are connected to the first portion of the power system to modify an output power of the at least one energy resource based on the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

The details of one or more examples are set forth in the accompanying drawings and the description below. Other features, objects, and advantages will be apparent from the description and drawings, and from the claims.

DETAILED DESCRIPTION

The present disclosure may provide systems, devices, and methods for real-time (or near-real-time) regulation of energy resources in a power distribution grid or other power system to maximize operational objectives. The techniques described herein may, for example, be employed in operation and control of power systems having high integration of distributed energy resources (DERs). Voltage, power, and current measurements from locations in the power system may be collected and used to update a set of coefficients. Those coefficients may then be used to update power setpoints for DERs in the power system.

Related art approaches for regulating frequency and maintaining a reliable operation of transmission systems may leverage primary frequency response, AGC, and/or regulation services provided by large-scale synchronous generators. In the future, however, DERs at both utility and residential/commercial levels will likely need to supplement generation-side capabilities, by providing additional flexibility in regulating frequency and maintaining reliable system operation.

The techniques of the present disclosure may be implemented in various devices to achieve such flexibility. By utilizing multiple measurement types from throughout the power system, the techniques described herein may provide improved frequency regulation, more reliable system operation, and/or improved power generation and/or consumption. Furthermore, the techniques described herein address both wye- and delta-connections, allowing for implementation in power systems having multi-phase devices as well as power systems having single phase devices. In addition, the techniques of the present disclosure may provide a uniform approach that addresses collections of DERs, which may be controlled as a group, as well as single, individually-controlled DERs.

Figure 1:
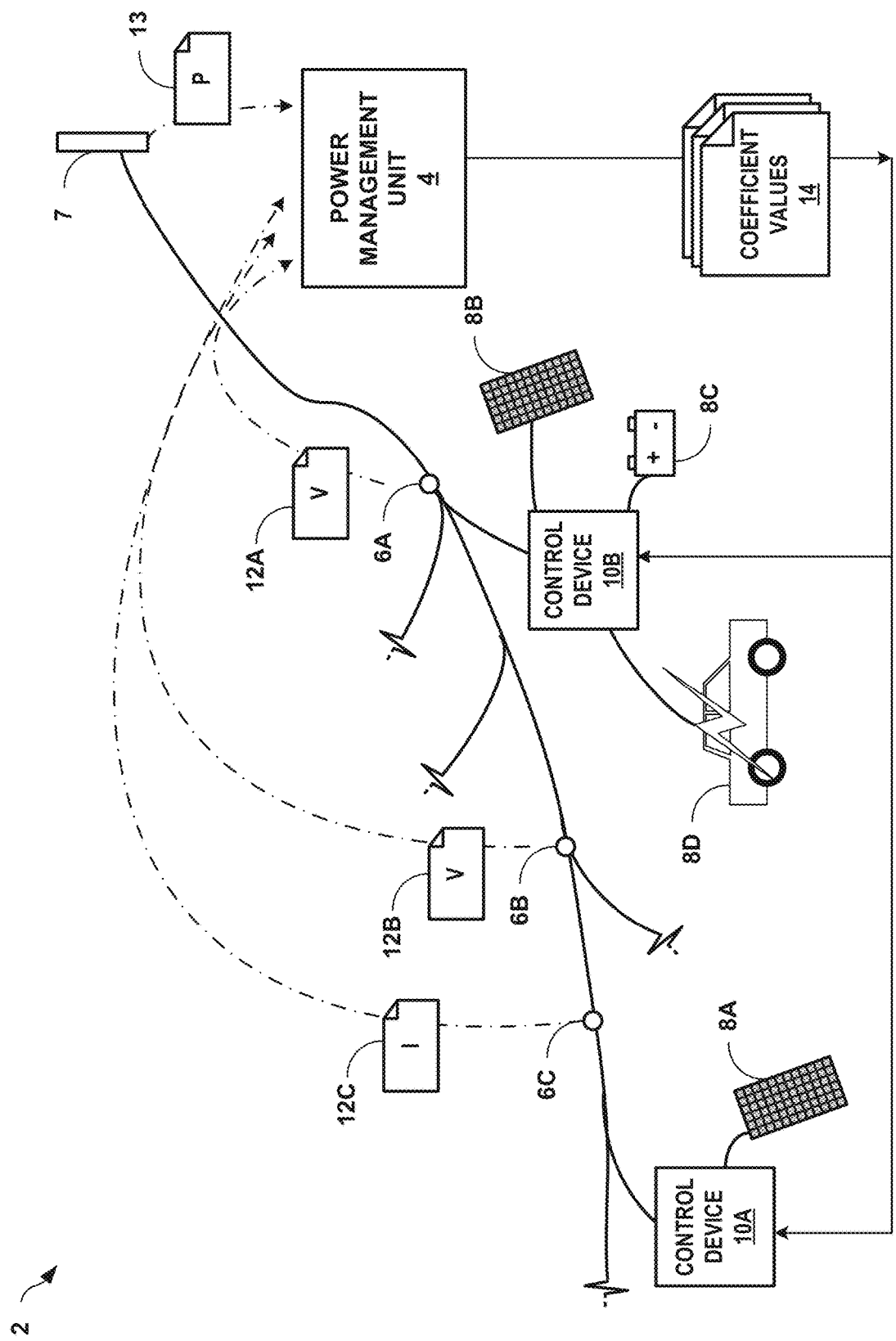
FIG. 1 is a conceptual diagram illustrating an example power management system configured to manage distributed energy resources in a power system, in accordance with one or more aspects of the present disclosure.

FIG. 1 is a conceptual diagram illustrating an example power management system (e.g., system 2) configured to manage energy resources in a power system, in accordance with one or more aspects of the present disclosure. In the example of FIG. 1, system 2 includes power management unit 4 and control devices 10A and 10B (collectively "control devices 10"). System 2 also includes nodes 6A-6C (collectively "nodes 6"), connection point 7, and energy resources 8A-8C (collectively "energy resources 8"). As shown in the example of FIG. 1, nodes 6, connection point 7, and control devices 10 are all connected via a network of power lines and, with those power lines, may represent a "power system".

System 2, as shown in the example of FIG. 1, manages a simplified power system. In other examples, the power system may include any number of additional ones of nodes 6, energy resources 8, and/or control devices 10. Thus, while shown in FIG. 1 as having three nodes and four energy resources, the power system may, in other examples, include more or fewer nodes, energy resources, and/or control devices in other examples. For instance, the techniques of the present disclosure may be used with a micro-grid, a subset of a power distribution network, an entire power distribution network, a community power grid (e.g., in which a collection of residents implement a local power network), a campus power grid (e.g., in which a company or educational institution implements its own power network), or any other collection of connected power generation and consumption devices. Additionally, System 2 of FIG. 1 represents only one example of a system configured to perform the techniques described herein, and various other systems, having additional components, fewer components, and/or other components, may be used in accordance with the present disclosure.

In the example of FIG. 1, nodes 6 are devices configured to measure electrical quantities at a location of the power system and output the measurement. For example, nodes 6 may be configured to measure voltage values and/or current values at their respective locations. Nodes 6 may be located at any point in the power system. In some examples, one or more of nodes 6 may be in the middle of a power line. In some examples, one or more of nodes 6 may be at a junction of two or more power lines. Examples of nodes 6 include phasor measurement units, current meters, inverters, power substations, and other systems or devices capable of determining the relevant electrical quantity at a location in the power system.

Nodes 6A and 6B are configured to determine respective voltage measurements 12A and 12B on an iterative basis. Each voltage measurement may represent the present voltage at a particular location in the power system. Node 6C is configured to determine a current measurement 12C on an iterative basis. Each current measurement may represent the present current flowing through a particular power line in the power system. Voltage measurements 12A and 12B and current measurement 12C may be collectively referred to herein as "measurements 12".

In the example of FIG. 1, connection point 7 represents a point at which the power system is connected to a larger system. For example, the power system shown in FIG. 1 may represent a power distribution network and connection point 7 may represent its connection to a power transmission network. As another example, the power system in FIG. 1 may represent a subset of a power distribution network and connection point 7 may connect the power system to the broader power distribution network. In other words, connection point 7 is the point at which the smaller power system shown in FIG. 1 connects to the rest of the power system.

Connection point 7 is configured to measure a local power measurement and output that measurement. In the example of FIG. 1, for instance connection point 7 is configured to determine power measurement 13 on an iterative basis. Power measurement 13 may represent an amount of real power being delivered to the power network shown in FIG. 1 from the rest of the power network. Examples of connection point 7 include a power substation, a point of connection of a microgrid to the rest of the grid, a single metering point for a community-level aggregation, or other suitable facility and/or device.

Components of system 2 (e.g., nodes 6, connection point 7, power management unit 4, and/or control devices 10) may be configured to perform the techniques described herein in an iterative fashion that allows system 2 to maximize operational objectives while coping with the variability of ambient conditions and non-controllable assets within the power system. That is, the techniques described herein may be performed on a relatively fast time scale, thereby allowing more efficient operation of the power system while ensuring that physical constraints (e.g., line maximums, device safety standards, etc.) are maintained. For instance, the components of system 2 may perform operations every second, every millisecond, or at some other interval. In some examples, different components may perform operations at different intervals while in other examples, all components of system 2 may generally perform the operations described herein with the same frequency.

In accordance with the techniques described herein, nodes 6 may output measurements 12 and connection point 7 may output power measurement 13. In the example of FIG. 1, for instance, nodes 6 and connection point 7 may transmit measurements 12 and power measurement 13 to power management unit 4 using wireless and/or wired communication. In other examples, nodes 6 and/or connection point 7 may additionally or alternatively transmit measurements 12 and/or power measurement 13 to one or more other components of system 2, such as one or more of control devices 10.

In the example of FIG. 1, power management unit 4 is configured to manage the power system shown in FIG. 1 to provide power to consumers. In such example, power management unit 4 may manage the distribution of power from DERs within the power system shown in FIG. 1, as well as the receipt and distribution of power from the larger power system (e.g., via connection point 7), while avoiding overloading and ensuring that consumers' power needs are met. In some examples, power management unit 4 may represent a system owned and operated by a utility company. In other examples, power management unit 4 may be owned and/or operated by another entity. For instance, power management unit 4 may represent an access point of a power network of a business park or corporate campus. As another example, power management unit 4 may manage a micro-grid, such as may be employed on a military base, mobile hospital, or other small area in which electrical power may be desirable. In other words, power management unit 4 may represent any system configured to manage power distribution via a power network.

Power management unit 4 may be a computing device, such as a server computer, a desktop computer, or any other device capable of implementing some or all of the techniques described herein. In some examples, power management unit 4 may represent a cloud computing environment. That is, while shown as a single box in the example of FIG. 1, power management unit 4 may, in some examples, be a group of distributed computing resources that communicate with one another to perform at least some of the techniques described herein. In some examples, power management unit 4 may be the same as or be physically collocated with connection point 7. For instance, connection point 7 may represent the connection between the power system shown in FIG. 1 and a power transmission network and may be a power substation that is configured to perform the operations of power management unit 4 as described herein. In some examples, such as the example shown in FIG. 1, connection point 7 and power management unit 4 may be physically separated.

In the example of FIG. 1, power management unit 4 may receive measurements 12 and power measurement 13. Based on measurements 12 and power measurement 13, power management unit 4 may iteratively determine a set of coefficient values ("coefficient values 14"). These coefficients may be related to defined voltage, current, and power constraints in the power system, and may be determined as further described herein. In the simplified example of FIG. 1, for instance, power management unit 4 may determine two voltage-constraint coefficients for each node from which a voltage measurement is received, a current-constraint coefficient for each node from which a current measurement is received, and two power-constraint coefficients. Thus, in the simplified example of FIG. 1, coefficient values 14 may include seven values.

For each of nodes 6A and 6B, power management unit 4 may determine a first voltage-constraint coefficient value based on a previous value of the first voltage-constraint coefficient for the node, a minimum voltage value for the node, and the voltage measurement for the node. Thus, for node 6A, power management unit 4 may determine a first voltage-constraint coefficient value based on the previous first voltage-constraint coefficient value for node 6A, a minimum voltage value, and voltage measurement 12A. Similarly, for each of nodes 6A and 6B, power management unit 4 may determine a second voltage-constraint coefficient value based on a previous value of the second voltage-constraint coefficient, a maximum voltage value, and the voltage measurement for the node. In some examples, the first and second voltage-constraint coefficient values for each node may be determined additionally or alternatively based on other criteria. Determination of values for the first and second voltage-constraint coefficients is further described with respect to FIGS. 2-4 below. Power management unit 4, in the example of FIG. 1, may output coefficient values 14 to each of control devices 10.

Control devices 10, in the example of FIG. 1, are configured to manage the power output of one or more respective energy resources. For instance, inverter 10A may represent an inverter configured to receive power from energy resource 8A (e.g., a PV panel) and transform the power into a form that can be transmitted via the connected power system. Power inverters, in general, may perform various operations to make the power output of energy resources more stable and/or more compatible with power systems. Control device 10B may represent a home energy management device configured to receive power from energy resources 8B, 8C, and 8D (e.g., a PV panel, an energy storage device, and an electric vehicle (EV), respectively), manage the distribution of that power among the home, and manage power received or transmitted via the connected power system. That is, control device 10B may represent an aggregated system that manages more than one DER.

In the example of FIG. 1, each of control devices 10 may receive coefficient values 14. Control devices 10 may use coefficient values 14 to determine one or more power setpoint values that dictate the levels of real and/or reactive power that are to be outputted by the associated energy resource or energy resources. For example, control device 10A would determine setpoint values for energy resource 8A and control device 10B would determine respective setpoint values for energy resources 8B, 8C, and 8D. Each of control devices 10 may determine setpoint values based on the coefficient values 14 and previous setpoint values for the control device. Determination of setpoint values is further described with respect to FIGS. 2-5 below. Control devices 10 may use the determined setpoint values to manage the power outputs of energy resources 8.

Energy resources 8 may, in various examples, represent any device or system capable of generating electrical power. In the example of FIG. 1, for instance, energy resources 8A and 8B are PV panels, energy resource 8C is an energy storage device (e.g., a battery or battery system), and energy resource 8D is an EV. Other examples of energy resources include generators (e.g., gas generators, etc.), fuel cells, and others.

While certain operations are described in the example of FIG. 1 as being performed by power management unit 4 or control devices 10, these operations may, in other examples, be performed by one or more other components of system 2, or by components not shown in FIG. 1. In some examples, for instance, each of control devices 10 may be configured to receive measurements 12 and power measurement 13 and determine coefficient values 14. As another example, power management unit 4 may, in some instances, be configured to determine setpoint values for each of control devices 10. In yet another example, one or both of these operations may be performed by one or more standalone computing devices (not shown) that communicate with control devices 10. This may be the case when, for example, one or more of control devices 10 are legacy devices that do not have sufficient computing power or communications abilities.

By iteratively determining power setpoints on a real-time or near real-time basis, performance of system 2 may achieve near optimum management of the power system without requiring complex or computationally powerful components. Additionally, by incorporating voltage measurements, current measurements, and power measurements, the techniques described herein ensure that limits on these quantities are not violated.

The mathematical development of the control techniques described herein is detailed below. Upper-case and lower-case boldface letters will be used for matrices and column vectors; $(\cdot)^T$ for transposition; $(\cdot)^*$ for complex-conjugate; and $(\cdot)^H$ for complex-conjugate transposition. $\Re\{\cdot\}$ and $\Im\{\cdot\}$ denote the real and imaginary parts of a complex number, respectively. $j:=\sqrt{-1}$, the imaginary unit; and $|\cdot|$ denotes the absolute value of a number or the cardinality of a (discrete) set. For a given N×1 vector $x\in\mathbb{R}^N$, $|x|$ takes the absolute value entry-wise; $\|x\|_2:=\sqrt{x^H x}$; and diag(x) returns a N×N matrix with the elements of x in its diagonal. Given a given matrix $X\in\mathbb{R}^{N\times M}$, $x_{m,n}$ denotes its (m, n)-th entry and $\|X\|_2$ denotes the $l_2$-induced matrix norm. For a function $f: \mathbb{R}^N\to\mathbb{R}$, $\nabla_x f(x)$ returns the gradient vector of $f(x)$ with respect to $x\in\mathbb{R}^N$. $1_N$ denotes the N×1 vector with all ones, and $0_N$ denotes the N×1 vector with all zeros. Given two sets $\chi_1\subset\mathbb{R}^N$ and $\chi_2\subset\mathbb{R}^N$, $\chi_1\oplus\chi_2$ denotes the Minkowski sum of $\chi_1$ and $\chi_2$. Finally, $\text{proj}_\chi\{x\}$ denotes the projection of x onto the convex set $\chi$.

The present disclosure addresses two classes of DERs: i) devices that are individually controllable; and, ii) groups of DERs that can be controlled as a whole. The second class may model, for example, residential homes and buildings with multiple DERs behind the meter, renewable-based systems with multiple inverters or microinverters, parking garages for EVs, and other aggregate systems. Each DER may be either wye-connected or delta-connected to the power system, and it can be either single-phase or three-phase. In the following, pertinent notation and modeling details are outlined.

For future developments, let $\mathcal{P}:=\{a, b, c\}\cup\{ab, bc, ca\}$ be the set of possible connections, with $\{a, b, c\}$ referring to wye connections (e.g., line to ground) and $\{ab, bc, ca\}$ referring to delta connections (e.g., line to line).

Let $\mathcal{D}:=\{1,\ldots,D\}$ be the set of individually-controllable DERs, and let $x_j:=[P_j, Q_j]^T\in\mathbb{R}^2$ collect the real and reactive power setpoint of DER $j\in\mathcal{D}$. The DER can be either wye-connected or delta-connected to the network. Three-phase DERs are assumed to operate in a balanced setting; thus, the setpoint $x_j$ is the same across phases. The set $\mathcal{P}_j\subset\mathcal{P}$ collects the phases where DER j is connected.

Denote as $\chi_j\subset\mathbb{R}^2$ the set of possible power setpoints $x_j$ for the DER j. The set $\chi_j$ captures hardware and operational constraints and it is assumed to be convex and compact. It is assumed that the DERs are endowed with control devices (e.g., control devices 10 of FIG. 1) that are designed so that, upon receiving the setpoint $x_j\in\chi_j$, the output powers of the DERs are driven to the commanded setpoints. Relevant dynamical models for the output powers of an inverter-interfaced DER are discussed in the art and can be found in datasheets of commercially available DERs.

For an inverter-interfaced DER, consider the following prototypical representation of the set $\chi_j$:

$$\chi_j(\underline{p},\overline{p},r) := \{[P_j, Q_j]^T : \underline{p} \leq P_j \leq \overline{p}, P_j^2 + Q_j^2 \leq r^2\} \quad (1)$$

where $\underline{p}$, $\overline{p}$, and $r>0$ are given DER-dependent parameters. For example, for a PV system, $r$ represents the inverter capacity, $\underline{p}=0$, and $\overline{p}$ is the available real power. For an energy storage system, $r$ represents the inverter rating, and $\underline{p}$; $\overline{p}$ are updated during the operation of the battery based on the current state of charge. Notice that the set $\chi_j$ is typically time varying, as the parameters $\underline{p}$, $\overline{p}$, and $r$ vary over time based on ambient conditions and/or internal DER state.

On the other hand, consider the following operating region for DERs with controllable active powers (e.g., variable speed drives, EVs, etc.):

$$\chi_j(\underline{p},\overline{p}) := \{[P_j, Q_j]^T : \underline{p} \leq P_j \leq \overline{p}, Q_j = 0\}. \quad (2)$$

With regard to DERs having discrete controls, let $\tilde{\chi}_j \subset \mathbb{R}^2$ denote the nonconvex operating region of a DER with a discrete set of implementable power setpoints. This may be the case, for example, for HVAC systems where $\tilde{\chi}_j = \{[P_j, Q_j]^T : P_j \in \{0, \overline{p}\}, Q_j = 0\}$, or EVs with discrete charging levels. For these devices, the set $\chi_j$ is the convex hull of $\tilde{\chi}_j$; i.e., $\chi_j := \text{ch}\tilde{\chi}_j$. For example, for an HVAC system, $\chi_j = \{[P_j, Q_j]^T : 0 \leq P_j \leq \overline{p}, Q_j = 0\}$. The control techniques described herein utilize a randomization procedure to recover implementable setpoints based on $\chi_j$. For a DER with discrete controls, $\tilde{x}_j \in \tilde{\chi}_j$ denotes an implementable setpoint, whereas $x_j \in \chi_j$ is a (relaxed) setpoint computed based on the convex hull of $\chi_j$.

In some examples, the power system may feature a set $\overline{\mathcal{D}} := \{1, \ldots, \overline{D}\}$ of residential homes, building, or other facilities that have multiple DERs that are controlled jointly. Let $\overline{\mathcal{D}}_j := \{1, \ldots, \overline{D}_j\}$ denote the set of devices within the jth aggregation, and define as $\overline{x}_j := \Sigma_{i \in \overline{\mathcal{D}}_j} x_i$ the setpoint for the net powers generated by the DERs within a group. The set $\overline{\mathcal{P}}_h \subset \mathcal{P}$ collects the connections of the aggregation j.

Let $\overline{\chi}_j \subseteq \oplus_{i \in \overline{\mathcal{D}}_j} \chi_j$ be either the exact Minkowski sum of the operating regions of the DERs within the jth aggregation or an appropriate inner approximation. Notice that if a DER i involves discrete controls, the convex hull $\chi_j = \text{ch}\tilde{\chi}_j$ may be utilized to compute the (inner approximation of) the Minkowski sum. In the following, pertinent results for the Minkowski sum of sets (1) and (2) are provided. First, notice that the Minkowski sum of two sets $\chi_j(\underline{p}_j, \overline{p}_j)$ and $\chi_n(\underline{p}_n, \overline{p}_n)$ for two DERs with controllable active powers is given by:

$$\chi_j(\underline{p}_j, \overline{p}_j) \oplus \chi_n(\underline{p}_n, \overline{p}_n) = \{\overline{x} = [P, Q]^T : \underline{p}_j + \underline{p}_n \leq P \leq \overline{p}_j + \overline{p}_n, Q = 0\}. \quad (3)$$

The following theorems will deal with the Minkowski sum of the sets $\chi_j(\underline{p}_j, \overline{p}_j, r_j) \oplus \chi_n(\underline{p}_n, \overline{p}_n)$ and $\chi_j(\underline{p}_j, \overline{p}_j, r_j) \oplus \chi_n(\underline{p}_n, \overline{p}_n, r_n)$.

The Minkowski sum between $\chi(\underline{p}_1, \overline{p}_1, r_1)$ and $\chi(\underline{p}_2, \overline{p}_2, r_2)$ in (1) and (2), respectively, is given by $$X(\underline{p}_1, \overline{p}_1, r_1) \oplus X(\underline{p}_2, \overline{p}_2, r_2) = \{[P, Q]^T : \underline{p}_1 + \underline{p}_2 \leq P \leq \overline{p}_1 + \overline{p}_2, \quad (4)$$
$$|Q| \leq r, (\underline{p}_2 - P)^2 + Q^2 \leq r^2, (P - \overline{p}_2)^2 + Q^2 \leq r^2\}$$

and it is convex and compact. This is hereinafter referred to as Theorem 1.

Inner and outer approximations of the Minkowski sum of two sets $\chi(\underline{p}_1, \overline{p}_1, r_1)$ and $\chi(\underline{p}_2, \overline{p}_2, r_2)$ are given by $$\chi(\underline{p}_1 + \underline{p}_2, \overline{p}_1 + \overline{p}_2, \rho) \subseteq \chi(\underline{p}_1, \overline{p}_1, r_1) \oplus \chi(\underline{p}_2, \overline{p}_2, r_2) \quad (5a)$$

$$\subseteq \chi(\underline{p}_1 + \underline{p}_2, \overline{p}_1 + \overline{p}_2, r^1 + r^2) \quad (5b)$$

for any $\rho > 0$ satisfying the following condition $$\rho^2 \leq r_1^2 + r_2^2 + \alpha - \beta_1 - \beta_2 + 2\sqrt{(r_1^2 - \beta_1)(r_2^2 - \beta_2)} \quad (6)$$

where $\alpha := [\max\{\underline{p}_1 + \underline{p}_2, \min\{0, \overline{p}_1 + \overline{p}_2,\}\}]^2$, and $\beta_i := \max\{\underline{p}_i^2, \overline{p}_i^2\}$, $i=1,2$. This is hereinafter referred to as Theorem 2.

Notice that the inner approximation $\chi(\underline{p}_1 + \underline{p}_2, \overline{p}_1 + \overline{p}_2, \rho)$ is convex and compact, and it is in the form of (1). Expression (3) along with the results of Theorem 1 and Theorem 2 can be utilized to compute an inner approximation of the feasible region of the net powers $\overline{x}_j$ for each aggregation of DERs $j \in \overline{\mathcal{D}}$. For example, the feasible region for the net powers generated by a residential house with a PV system, a battery, and an EV can be computed by first leveraging (5a) to sum the sets pertaining to the PV system and the battery and subsequently (4).

Next, consider a generic multi-phase power system (e.g., a power distribution network) with multiphase nodes collected in the set $\mathcal{N} \cup \{0\}$, $\mathcal{N} := \{1, \ldots, N\}$, and power lines (e.g., distribution lines) represented by the set of edges $\varepsilon := \{(m, n)\} \subset (\mathcal{N} \cup \{0\}) \times (\mathcal{N} \cup \{0\})$. Node 0 denotes the three-phase slack bus (e.g., the point of connection of the power system with the rest of the electrical system). At each multiphase node, controllable and non-controllable devices can be either wye- or delta-connected.

Presented below is a brief showcase of the set of AC power-flow equations for this generic setting. Let $v$ be a vector collecting the line-to-ground voltages in all phases of the nodes in $\mathcal{N}$; similarly, vector $i$ collects all the phase net current injections, $i^\Delta$ the phase-to-phase currents in all the delta connections, and vectors $s^Y$ and $s^\Delta$ collect the net complex powers injected at nodes $\mathcal{N}$ from devices with wye and delta connections, respectively. With these definitions in place, the AC power-flow equations can be compactly written as:

$$\text{diag}(H^T(i^\Delta) + s^Y) = \text{diag}(v)i^*, \quad (7a)$$

$$s^\Delta = \text{diag}(Hv)(i^\Delta), \quad (7b)$$

$$i = Y_{L0}v_0 + Y_{LL}v, \quad (7c)$$

where $Y_{00} \in \mathbb{C}^{3 \times 3}$, $Y_{L0} \in \mathbb{C}^{N_\phi \times 3}$, $Y_{0L} \in \mathbb{C}^{3 \times N_\phi}$, and $Y_{LL} \in \mathbb{C}^{N_\phi \times N_\phi}$ are the submatrices of the admittance matrix $$Y := \begin{bmatrix} Y_{00} & Y_{0L} \\ Y_{L0} & Y_{LL} \end{bmatrix} \in \mathbb{C}^{N_\phi + 3 \times N_\phi + 3}, \quad (8)$$

which can be formed from the topology of the network and the $\pi$-model of the distribution lines. $N_\phi$ is the total number of single-phase connections and H is a $N_\phi \times N_\phi$ block-diagonal matrix mapping the direction of the currents $i^\Delta$ in the delta connections.

The nonlinearities in (7) hinder the possibility of seeking analytical closed-form solutions to pertinent electrical quantities such as voltages, power flows, and line currents as a function of the DERs' power injections. To facilitate the design and analysis of real-time optimization methods, the techniques described herein leverage approximate linear models developed in the literature. To this end, denote as $\mathbf{v}_{\mathcal{M}_v}$ the vector collecting the phase-to-ground voltages at given measurement points; $\mathbf{i}_{L,\mathcal{M}_i}$ the vector collecting the line currents for a subset of monitored distribution lines (or given by pseudo-measurements); and, $p_0 \in \mathbb{R}^3$ the vector of real powers entering node 0 on the phases $\{a, b, c\}$. Then, $|\mathbf{v}_{\mathcal{M}_v}|$ (where the absolute value is taken entry-wise), $|\mathbf{i}_{L,\mathcal{M}_i}|$, and $p_0$ can be approximately expressed as:

$$|\tilde{\mathbf{v}}_{\mathcal{M}_v}(x,\bar{x})| = \sum_{j \in \mathcal{D}} A_j x_j + \sum_{j \in \overline{\mathcal{D}}} \overline{A}_j \bar{x}_j + a \quad (9a)$$

$$a := \sum_{j \in \mathcal{N}} \sum_{\phi \in \mathcal{P}} A_{j,\phi} \ell_{j,\phi} + a_0 \quad (9b)$$

$$|\tilde{\mathbf{i}}_{L,\mathcal{M}_i}(x,\bar{x})| = \sum_{j \in \mathcal{D}} B_j x_j + \sum_{j \in \overline{\mathcal{D}}} \overline{B}_j \bar{x}_j + b \quad (10a)$$

$$b := \sum_{j \in \mathcal{N}} \sum_{\phi \in \mathcal{P}} B_{j,\phi} \ell_{j,\phi} + b_0 \quad (10b)$$

$$\tilde{p}_0(x,\bar{x}) = \sum_{j \in \mathcal{D}} M_j x_j + \sum_{j \in \overline{\mathcal{D}}} \overline{M}_j \bar{x}_j + m \quad (11a)$$

$$m := \sum_{j \in \mathcal{N}} \sum_{\phi \in \mathcal{P}} M_{j,\phi} \ell_{j,\phi} + m_0 \quad (11b)$$

where $\ell_{j,\phi} \in \mathbb{R}^2$ collects the net non-controllable active and reactive powers at connection $\phi \in \mathcal{P}$ of node $n \in \mathcal{N}$, x and $\bar{x}$ stack all the setpoints $\{x_j\}$ and $\bar{x}_j$, respectively, and the matrices $A_{j,\phi}$, $\overline{A}_{j,\phi}$, $B_{j,\phi}$, $\overline{B}_{j,\phi}$, $M_{j,\phi}$, $\overline{M}_{j,\phi}$ along with the vectors $a_0$, $b_0$, and $m_0$ are model parameters that can be computed through e.g., the fixed-point linearization method. For brevity, define the matrices $A_j := \sum_{\phi \in \mathcal{P}_j} A_{j,\phi}$, $\overline{A}_j := \sum_{\phi \in \overline{\mathcal{P}}_j} \overline{A}_{j,\phi}$, $B_j := \sum_{\phi \in \mathcal{P}_j} B_{j,\phi}$, $\overline{B}_j := \sum_{\phi \in \overline{\mathcal{P}}_j} \overline{B}_{j,\phi}$, $M_j := \sum_{\phi \in \mathcal{P}_j} M_{j,\phi}$, $\overline{M}_j := \sum_{\phi \in \overline{\mathcal{P}}_j} \overline{M}_{j,\phi}$. These model parameters capture the effects of different types of connection (e.g., wye or delta) and can be computed based on the admittance matrix of the system. If a fixed-point linearization method is utilized, knowledge of the non-controllable powers $\ell_{j,\phi}$ is not required for the computation of the model parameters. If only wye connections are present, alternative ways to obtain (9)-(11) may be used.

It is worth emphasizing that the approximate models (9)-(11) are utilized to facilitate the design and the performance analysis of the real-time algorithm. However, appropriate measurements from distribution grid and DERs may be accommodated as described herein to cope with inaccuracies in the representation of the AC power flows and stability claims under the (realistic) nonlinear model are established below.

Hereafter, the subscripts $\mathcal{M}_v$ and $\mathcal{M}_i$ will be dropped from (9) and (10) for notational simplicity, with the understanding that functions $v(x,\bar{x})$ and $i_L(x,\bar{x})$ refer to voltages and currents at given points of interest.

From this setup, the real-time optimization techniques may be designed such that power setpoints of the DERs are updated on a second-wise (or similar) timescale to maximize operational objectives while coping with the variability of ambient conditions and non-controllable assets. Consider, then, discretizing the temporal domain as $t_k = kh$, where $k \in \mathbb{N}$ and $h > 0$ will be taken to be the time required to compute one closed-loop iteration of the process disclosed herein. As discussed shortly, the value of h is based on underlying communication delays, as well as operational considerations of utility and aggregators.

Next, the time-varying optimization formalism may be leveraged to model optimal operational trajectories for the DERs, based on 1) possibly time-varying optimization objectives, engineering limits (e.g., voltage limits and Ampacity limits), as well as 2) variability of non-controllable assets and ambient conditions. Hereafter, the superscript $(k)$ will be utilized to indicate variables, functions, and inputs at time $t_k$, for all $k \in \mathbb{N}$.

Let $v^{min}$ and $v^{max}$ be given limits for the magnitude of phase-to-ground voltages (e.g., ANSI C.84.1 limits), and let $i^{max}$ be a vector collecting the Ampacity limits for the monitored distribution lines. Finally, $s^{(k)} \in \{0,1\}$ indicates whether the power system is requested to follow a setpoint $p_{0,set}^{(k)}$ for the real powers at the three phases of the point of connection with the rest of the electrical network. When $s^{(k)} = 1$, the sequence of setpoints $\{p_{0,set}^{(k)}\}_k$ shall be tracked within a given accuracy $E^{(k)}$. With these definition, the following time-varying optimization problem is formulated to model optimal operational trajectories $\{x_j^{opt}, k \in \mathbb{N}\}$ for the DERs:

$$(P1^{(k)}) \min \sum_{j \in D} f_j^{(k)}(x_j) + \sum_{j \in \overline{D}} \overline{f}_j^{(k)}(\bar{x}_j) \quad (12a)$$

$$\text{subject to}: x_j \in \mathcal{X}_j^{(k)} \; \forall \; j \in \mathcal{D} \quad (12b)$$

$$\bar{x}_j \in \overline{\mathcal{X}}_j^{(k)} \; \forall \; j \in \overline{\mathcal{D}} \quad (12c)$$

$$s^{(k)} I_3 (\tilde{p}_0^{(k)}(x,\bar{x}) - p_{0,set}^{(k)}) \le E^{(k)} 1_3 \quad (12d)$$

$$s^{(k)} I_3 (p_{0,set}^{(k)} - \tilde{p}_0^{(k)}(x,\bar{x})) \le E^{(k)} 1_3 \quad (12e)$$

$$|\tilde{v}^{(k)}(x,\bar{x})| \le v^{max} 1 \quad (12f)$$

$$v^{min} 1 \le |\tilde{v}^{(k)}(x,\bar{x})| \quad (12g)$$

$$|\tilde{i}^{(k)}(x,\bar{x})| \le i^{max} \quad (12h)$$

recalling that $\chi_j^{(k)}$ is a convex set modeling hardware constraints of the DER j at a given time $t_k$, $f_j^{(k)}: \mathbb{R}^2 \to \mathbb{R}$ is a time-varying convex function associated with the DER $j \in \mathcal{D}$, and the function $\overline{f}_j^{(k)}: \mathbb{R}^2 \to \mathbb{R}$ associated with the jth aggregation of DERs is defined as follows:

$$\overline{f}_j^{(k)}(\bar{x}_j) := \min_{x_i, i \in \overline{\mathcal{D}}_j} \sum_{i \in \overline{\mathcal{D}}_j} f_i^{(k)}(x_i) \quad (13a)$$

$$\text{subject to}: x_i \in \chi_i^{(k)}, \; \forall \; i \in \overline{\mathcal{D}}_j \quad (13b)$$

$$\sum_{i \in \overline{\mathcal{D}}_j} x_i = \bar{x}_j. \quad (13c)$$

Problem (13) is utilized to disaggregate the set setpoint $\bar{x}_j$ across the DERs $i \in \overline{\mathcal{D}}_j$.

Before proceeding, it is worth noting the following for the bi-level formulation (12)-(13):
i) when set $\overline{\chi}_j^{(k)}$ is given by the (exact) Minkowski sum of $\chi_i^{(k)}$, $i \in \overline{\mathcal{D}}_j$, (12)-(13) is equivalent to a "flat" optimization strategy where (12) does not consider points of aggregation (thus, the flat formulation includes individual optimization variables and constraints that pertain to all the DERs);
ii) if the set $\overline{\chi}_j^{(k)}$ is an inner approximation of the Minkowski sum, then (12)-(13) represents a restriction of the "flat" optimization problem.

Problem $(P1^{(k)})$ is a time-varying convex optimization problem; however, solving $(P1^{(k)})$ in a batch fashion at each time $t_k$ might be impractical, possibly because of the following three challenges:
c1: Complexity. For real-time implementations (e.g., when h is on the order of a second or a few seconds), it might be unfeasible to solve (P1$^{(k)}$) to convergence; this is especially the case of distributed settings, where multiple communication rounds are required to reach convergence.

c2. Model inaccuracy. The linear models (9)-(11) provide only an approximate relationship between power injections. As a result, the optimal solution of (P1$^{(k)}$) might not necessarily be feasible for the actual system.

c3. Pervasive metering. Solving (P1$^{(k)}$) (either in a batch form or online) requires collecting measurements of the (aggregate) noncontrollable loads $\ell_{j,\phi}$ at all locations in real time.

The techniques described herein use the following feedback-based online algorithm that tracks the optimal solution of (P1$^{(k)}$) over time, while coping with model inaccuracies and avoiding ubiquitous metering.

The following assumption is imposed throughout. For each DER i∈$\mathcal{D}$, and for each DER i∈$\overline{\mathcal{D}}_j$ in the aggregation j ∈ $\mathcal{D}$:
  i the set $\chi_i^{(k)}$ is convex and compact for all $t_k$;
  ii function $f_i^{(k)}(x_i)$ is convex and continuously differentiable, and its gradient is Lipschitz continuous for all $t_k$.

This is hereinafter referred to as Assumption 1.

Start by outlining the results pertaining to the DER aggregations $\overline{\mathcal{D}}$. Suppose that problem (13) is feasible and Assumption 1 holds. Then, the dual function associated with problem (13) is strongly concave. Moreover, the unique optimal dual variable associated with (13c) is bounded.

The function $\overline{f}_j^{(k)}(\overline{x})$ is convex. Under Assumption 1, the function $\overline{f}_j^{(k)}(\overline{x})$ is Lipschitz continuous. Further, the gradient of $\overline{f}_j^{(k)}(\overline{x})$ evaluated at $\overline{x}_j^{(k)}$ is given by:

$$\nabla_{\overline{x}} \overline{f}_j^{(k)} |_{\overline{x}=\overline{x}_j^{(k)}} = -\xi_j^{(k)} \quad (14)$$

where $\xi_j^{(k)}$ is the optimal dual variable associated with constraint (13c). This is hereinafter referred to as Theorem 3.

Under Assumption 1, the gradient $$\nabla_{\overline{x}} \overline{f}_j^{(k)}$$

is Lipschitz continuous. This is hereinafter referred to as Theorem 4.

Notice that Assumption 1.ii can be relaxed. In fact, if the function $f_i^{(k)}(x_i)$ is not strongly convex, one can regularize the problem (13) with a strongly convex term; e.g., the cost can be regularized as $\Sigma_{i\in\overline{D}_j} f_i^{(k)}(x_i)+r\|x_i\|_2^2$, for a given constant r>0. The results of Theorem 3 and Theorem 4 are valid at each time instant $t_k$. These results are utilized for the design of the real-time algorithm to update the aggregate setpoint $\overline{x}^{(k)}$, and to establish pertinent convergence and stability claims.

Let $\lambda^{(k)}$, $\mu^{(k)}$, $\gamma^{(k)}$, $\nu^{(k)}$, and $\zeta^{(k)}$ be the dual variables associated with constraints (12d), (12e), (12f), (12g), and (12h), respectively. The Lagrangian function associated with the problem (12) at time $t_k$ is given by:

$$L^{(k)}(x, x, d) := \sum_{i\in\mathcal{D}} f_i^{(k)}(x_j) + \sum_{J\in\mathcal{D}} \overline{f}_j^{(k)}(\overline{x}_j) + \quad (15)$$

-continued
$$\sum_{J\in\mathcal{D}} [s^{(k)}(\lambda-\nu)^T M_j x_j + (\gamma-\mu)^T A_j x_j + \zeta^T B_j x_j] +$$
$$\sum_{J\in\mathcal{D}} [s^{(k)}(\lambda-\nu)^T \overline{M}_j \overline{x}_j + (\gamma-\mu)^T \overline{A}_j \overline{x}_j + \zeta^T \overline{B}_j \overline{x}_j] +$$
$$s^{(k)}(\lambda-\nu)^T(m_0 - p_{0,set}^{(k)}) - (\lambda-\nu)^T E^{(k)} 1 +$$
$$\gamma^T(a_0^{(k)} - \nu^{max} 1) + \mu^T(\nu^{min} 1 - a_0^{(k)}) - \zeta^T i^{max}$$

where d:=$[\gamma^T, \nu^T, \lambda^T, \mu^T, \zeta^T]^T$ for simplicity of exposition and 1 is a vector of ones of appropriate dimensions. Consider the following regularized Lagrangian function, where $r_p, r_d > 0$ are regularization factors:

$$L_r^{(k)}(x, \overline{x}, d) := L^{(k)}(x, \overline{x}, d) + \frac{r_p}{2}\|x\|_2^2 + \frac{r_p}{2}\|x\|^2 - \frac{r_d}{2}\|d\|_2^2 \quad (16)$$

and notice that $L_r^{(k)}(x, \overline{x}, d)$ is strongly convex in the primal variables and strongly concave in the dual variables. Consider then the following time-varying saddle-point problem:

$$\max_{d\in\mathbb{R}_+^{2|\mathcal{M}_\nu|+|\mathcal{M}_i|+3}} \min_{\{x_j\},\{\overline{x}_j\}} L_r^{(k)}(x, \overline{x}, d) \quad (17)$$

and let $$z^{(k,*)} := [(x^{(k,*)})^T, (\overline{x}^{(k,*)})^T, (d^{(k,*)})^T]^T :$$

unique primal-dual optimizer of (17). The design of the online algorithm leverages appropriate modifications of online projected-gradient methods to track the time-varying solution of (17). Although the optimizer of (17) is expected to be different from optimizers of the original problem $$\max_{d\in\mathbb{R}_+^{2|\mathcal{M}_\nu|+|\mathcal{M}_i|+3}} \min_{\{x_j\},\{\overline{x}_j\}} L^{(k)}(x, \overline{x}, d),$$

it is shown below that the strong convexity and concavity of $L_r^{(k)}(x, \overline{x}, d)$ allows the real-time algorithm to achieve Q-linear convergence. The discrepancy between $x^{(k,*)}$, $\overline{x}^{(k,*)}$ and the solution of problem (P1$^{(k)}$) can be bounded using known techniques.

Let α>0 be a given step size. Then, given the results of Theorem 3 and based on the regularized time-varying saddle-point formulation (17), the execution of the following operations at each time $t_k$ defines the method for real-time optimization of the power system. The method produces power setpoints for the DERs at each time $t_k$, k∈$\mathbb{N}$.

At each $t_k$ perform the following operations:
  [S1a]: Collect voltage measurements $|\hat{v}^{(tk)}|$ at given measurement points $\mathcal{M}_\nu$ and perform the following updates:

$$\gamma^{(k+1)} = proj_{\mathbb{R}_+^{|\mathcal{M}_\nu|}}\{\gamma^{(k)} + \alpha(\nu^{min} 1 - |\hat{v}^{(tk)}| - r_d \gamma^{(k)})\} \quad (18)$$

$$\mu^{(k+1)} = proj_{\mathbb{R}_+^{|\mathcal{M}_\nu|}}\{\mu^{(k)} + \alpha(|\hat{v}^{(tk)}| - \nu^{max} 1 - r_d \mu^{(k)})\} \quad (19)$$

[S1b]: Obtain measurements or estimates of $\hat{\iota}_L^{(k)}$ on lines of interest and perform the following updates:

$$\zeta^{(k+1)} = proj_{\mathbb{R}_+^{|\mathcal{M}_l|}} \{\zeta^{(k)} + \alpha(|i_L^{(k)}| - i^{max} - r_d \zeta^{(k)})\} \quad (20)$$

[S1c]: Collect measurements $\hat{p}_0^{(k)}$ at point of coupling and perform the following updates:

$$\lambda^{(k+1)} = proj_{\mathbb{R}_+^3} \{\lambda^{(k)} + \alpha(\hat{p}_0^{(k)} - p_{0,set}^{(k)} - E^{(k)} 1_3 - r_d \lambda^{(k)})\} \quad (21)$$

$$\nu^{(k+1)} = proj_{\mathbb{R}_+^3} \{\nu^{(k)} + \alpha(p_{0,set}^{(k)} - \hat{p}_0^{(k)} - E^{(k)} 1_3 - r_d \nu^{(k)})\} \quad (22)$$

[S2a]: Each device $j \in \mathcal{D}$ performs the following operations:

[S2a.1] Measure output powers $\hat{x}_j^{(k)}$

[S2a.2] Update power setpoints $x_j^{(k+1)}$ as follows:

$$x_j^{(k+1)} = \quad (23)$$
$$proj_{\chi_j^{(k)}} \{\hat{x}_j^{(k)} - \alpha(\nabla_{x_j} f_j^{(k)}(\hat{x}_j^{(k)}) + s^{(k)}(\lambda^{(k+1)} - \nu^{(k+1)})^T M_j + \zeta^{(k+1)} B_j +$$
$$(\gamma^{(k+1)} - \mu^{(k+1)})^T A_j + r_p \hat{x}_j^{(k)})\}$$

[S2a.3] If DER $j \in \mathcal{D}$ has a set of discrete setpoints, determine the implementable setpoint as:

$$e_j^{(k)} = \sum_{\ell=1}^k (x_j^{(\ell)} - \tilde{x}_j^{(\ell)}) \quad (24)$$

$$\tilde{x}_j^{(k+1)} \in proj_{\tilde{\chi}_j^{(k)}} \{x_j^{(k+1)} + e_j^{(k)}\}. \quad (25)$$

[S2a.4] Command setpoint to the DER.

[S2b]: Each DER aggregation $j \in \overline{\mathcal{D}}$ performs the following operations:

[S2b.1] Measure aggregate output powers $\hat{\overline{x}}_j^{(k)}$

[S2a.2] Update setpoints for the aggregate powers $\overline{x}_j^{(k+1)}$ as follows:

$$\overline{x}_j^{(k+1)} = proj_{\overline{\chi}^{(k)}} \{\hat{\overline{x}}_j^{(k)} - \alpha(-\xi_j^{(k)} + s^{(k)}(\lambda^{(k+1)} - \nu^{(k+1)})^T \overline{M}_j + \quad (26)$$
$$\zeta^{(k+1)} \overline{B}_j + (\gamma^{(k+1)} - \mu^{(k+1)})^T \overline{A}_j + r_p \hat{\overline{x}}_j^{(k)})\}$$

[S2b.3] Given the aggregate powers $\overline{x}_j^{(k+1)}$, determine the setpoints $\{x_i \in \chi_i^{(k)}\}_{i \in \overline{\mathcal{D}}_i}$ of the individual DERs $\overline{\mathcal{D}}_j$ and the new vector $\xi_k^{(k+1)}$ by solving the saddle-point problem:

$$\max_{\xi} \min_{\{x_i \in \chi_i^{(k)}\}_{i \in \overline{\mathcal{D}}_j}} \Sigma_{i \in \overline{\mathcal{D}}_j} f_i^{(k)}(x_i) + \xi^T(\Sigma_{i \in \overline{\mathcal{D}}_j} x_i - \overline{x}_j^{(k+1)}) \quad (27)$$

[S2b.4] if DER $j \in \overline{\mathcal{D}}_j$ has a set of discrete setpoints, determine the implementable setpoint as:

$$e_j^{(k)} = \sum_{\ell=1}^k (x_j^{(\ell)} - \tilde{x}_j^{(\ell)}) \quad (28)$$

$$\tilde{x}_j^{(k+1)} \in arg\ min_{x \in \tilde{\chi}_j^{(k)}} \|x - (x_j^{(k+1)} + e_j^{(k)})\|_2. \quad (29)$$

[S2a.5] Command setpoint to the DER.

[S3]: Go to [S1].

Figure 2:
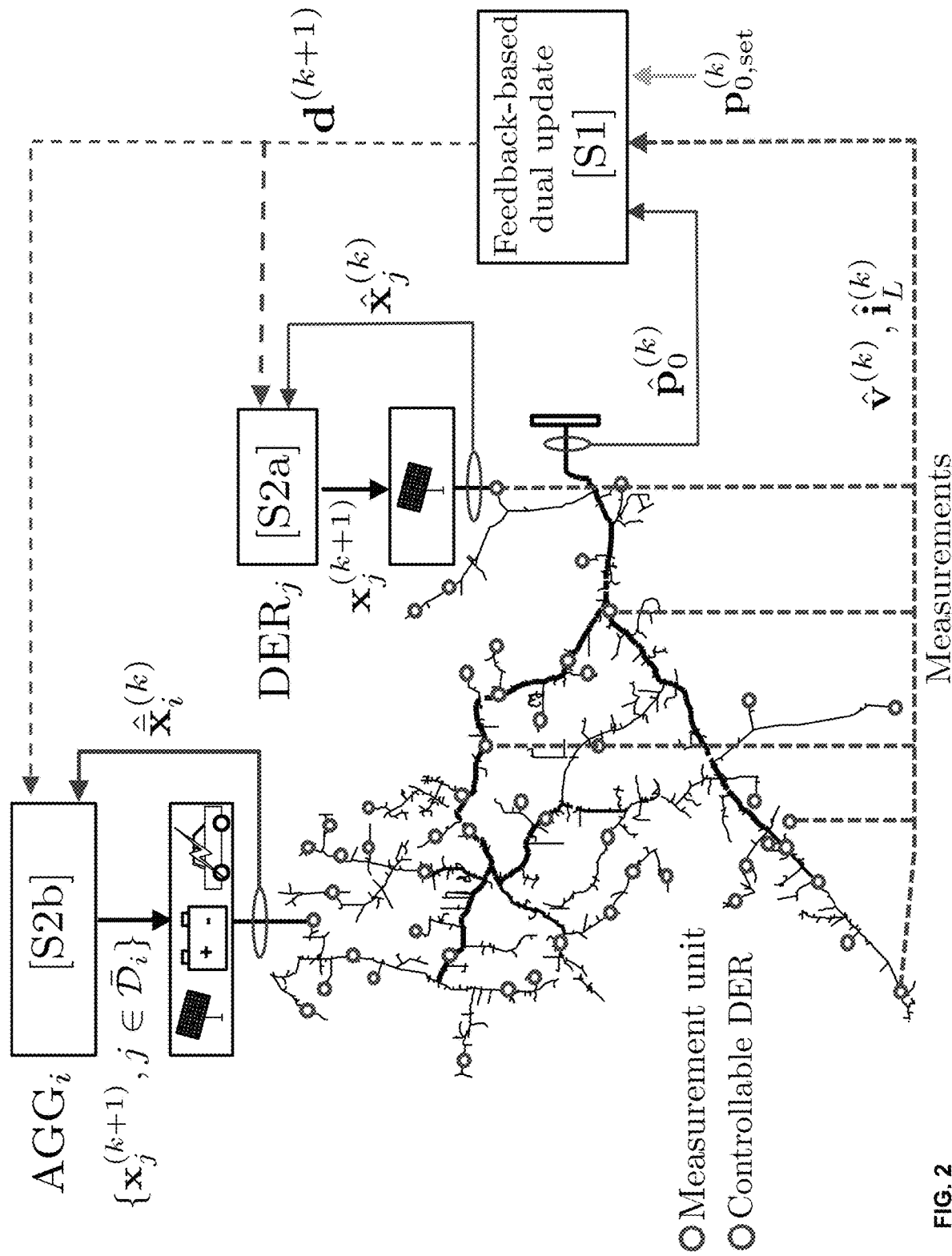
FIG. 2 is a conceptual diagram illustrating another example power management system configured to manage distributed energy resources in a power system, in accordance with one or more aspects of the present disclosure.

FIG. 2 is a conceptual diagram illustrating another example power management system configured to manage energy resources in a power system, in accordance with one or more aspects of the present disclosure. Specifically, the power management system shown in FIG. 2 implements the control method described by operations [S1]-[S3]. This real-time method affords a distributed implementation as shown in FIG. 2. Once measurements $\hat{v}^{(k)}$, $\hat{\iota}_L^{(k)}$, and $\hat{p}_0^{(k)}$ are acquired, operation [S1] may be performed at the utility/aggregator, which subsequently broadcasts the updated dual variables. Operations [S2a] and [S2b] may be implemented locally at individual DERs and aggregations of DERS, respectively.

Finally, notice that operations (25) and (29), which are performed for DERs with discrete setpoints, involve the solution of a localized nonconvex program to compute implementable commands.

The ability of the techniques described herein to track the optimizers $z^{(k,*)}$ of (17) is analytically established below.

start by stating the following assumption regarding problem (12). Problem (12) is feasible and Slater's condition holds at each time $t_k$, $k \in \mathbb{N}$. This is hereinafter referred to as Assumption 2.

Assumption 2 implies that there exists a power flow solution that adheres to voltage and ampacity limits. When the power system is required to follow a setpoint at the point of common coupling, Assumption 2 presumes that the setpoint is feasible. Feasibility of the power flow solutions (with and without setpoints for the active and reactive power at the substation) can be assessed by solving suitable optimization problems at a slower time scale.

Regarding the temporal variability of problem (12), the following quantity is introduced to capture the variation of the optimal solution trajectory over time:

$$\sigma^{(k)} := \|z^{(k+1,*)} - z^{(k,*)}\|_2 \leq \sigma \quad (30)$$

for a given $\sigma > 0$. For sufficiently small sampling intervals h, $\sigma$ can be interpreted as a bound on the norm of the gradient of the optimal solution trajectory $\{z^{(k,*)}\}_{k \in \mathbb{N}}$. In the context of (12), $\sigma$ depends on the variability of the cost function, non-controllable loads, as well as available powers from the renewable-based DERs.

Next, since models (9)-(11) are linear and the sets $\{\chi_j^{(k)}\}$ and $\{\overline{\chi}_j^{(k)}\}$ are compact, there exist constants $G_v \leq +\infty$, $G_0 \leq +\infty$, and $G_L \leq +\infty$ such that $$\|\nabla_{[x,\overline{x}]} \hat{v}^{(k)}(x,\overline{x})\|_2 \leq G_v,$$

$$\|\nabla_{[x,\overline{x}]} \hat{p}^{(k)}(x,\overline{x})\|_2 \leq G_0,$$

$$\|\nabla_{[x,\overline{x}]} \hat{\iota}^{(k)}(x,\overline{x})\|_2 \leq G_L.$$

For future developments, define $G := \max\{G_v, G_0, G_L\}$. Further, notice that from Assumption 1 and Theorem 4, the gradient map $g^{(k)}(x,\overline{x}) := [\nabla_{x_1}^T f_1^{(k)}(x_1), \ldots, \nabla_{x_{|\mathcal{D}|}}^T f_{|\mathcal{D}|}^{(k)}(x_{|\mathcal{D}|}),$ $\nabla_{\overline{x}_1}^T \overline{f}_1^{(k)}(\overline{x}_1), \ldots, \nabla_{\overline{x}_{|\overline{\mathcal{D}}|}}^T \overline{f}_{|\overline{\mathcal{D}}|}^{(k)}(\overline{x}_{|\overline{\mathcal{D}}|})]^T$ is Lipschitz continuous with a given constant $L^{(k)}$ over the set $\chi^{(k)}:=\chi_1^{(k)} \times \ldots \times \chi_{|D|}^{(k)} \times \bar{\chi}_1^{(k)} \times \ldots \times \bar{\chi}_{|B|}^{(k)}$. Let $L:=\limsup\{L^{(k)}\}$, so that $$\|g^{(k)}(x,\bar{x})-g^{(k)}(x',\bar{x}')\|_2 \leq L\|x-x'\|_2 \tag{31}$$

for all $x,x' \in \chi^{(k)}$ and $t_k$, $k \in \mathbb{N}$.

Define the errors introduced by measurement noise and modeling mismatches (i.e., discrepancy between the nonlinear AC power-flow equations and the linearized model, as well as possible inaccurate knowledge of the admittance matrix) as follows:

$$e_x^{(k)} := \left\|\begin{bmatrix} x^{(k)} \\ \bar{x}^{(k)} \end{bmatrix} - \begin{bmatrix} \hat{x}^{(k)} \\ \hat{\bar{x}}^{(k)} \end{bmatrix}\right\|_2 \tag{32}$$

$$e_0^{(k)} := \|\tilde{p}_0(x^{(k)}, \bar{x}^{(k)}) - \hat{p}_0^{(k)}\|_2 \tag{33}$$

$$e_v^{(k)} := \|\tilde{v}^{(k)}(x^{(k)}, \bar{x}^{(k)}) - |\hat{v}^{(k)}|\|_2 \tag{34}$$

$$e_L^{(k)} := \|\tilde{i}_L^{(k)}(x^{(k)}, \bar{x}^{(k)}) - |\hat{i}_L^{(k)}|\|_2 \tag{35}$$

recalling that $\hat{v}^{(k)}$, $\hat{i}^{(k)}$, and $\hat{p}_0^{(k)}$ are actual measurements (or pseudo-measurements). The following assumption is made. There exist finite constants $e_x$, $e_0$, $e_v$, and $e_L$ such that $e_x^{(k)} \leq e_x$, $e_0^{(k)} \leq e_0$, $e_v^{(k)} \leq e_v$, and $e_L^{(k)} \leq e_L$ for all $t_k$; that is, the errors (32)-(35) are uniformly bounded in time. This is hereinafter referred to as Assumption 3.

As previously discussed, DERs are presumed to be equipped with embedded controller devices that drive the output powers to the commanded setpoints; relevant dynamical models for the output powers of inverters operating in a grid-connected mode can be found in datasheets of commercially available DERs and/or in the literature. If the time constant of the controllers is longer than h, Assumption 3 bounds the discrepancy between the sampled output power and the commanded setpoint. For future developments, define the vector $e^{(k)}:=[(L+r_p)e_x^{(k)}, 1_2^T e_v^{(k)}, 1_2^T e_0^{(k)}, e_L^{(k)}]^T$, and notice from Assumption 3 that $\|e^{(k)}\|_2 \leq e$, $e := \sqrt{(L+r_p)^2 e_x^2 + 2e_v^2 + 2e_0^2 + e_L^2}$.

Let $$z^{(k)} := [(x^{(k)})^T, (\bar{x}^{(k)})^T, (d^{(k)})^T]^T$$

collect the primal and dual variables produced by the real-time algorithm at time $t_k$. Based on Assumptions 1-3, the main convergence results are established next.

Consider the sequence $\{z^{(k)}\}$ generated by the algorithm (18)-(29). The distance between $z^{(k)}$ and the primal-dual optimizer $x^{(k,*)}$ at time $t_k$ can be bounded as:

$$\|z^{(k)}-z^{(k,*)}\|_2 \leq c(\alpha,r_p,r_d)^k\|z^{(0)}-z^{(0,*)}\|_2 + \sum_{\ell=0}^{k-1} c(\alpha,r_p,r_d)^\ell (\alpha\|e^{(\ell)}\|_2 + \sigma^{(\ell)})^{k-\ell-1} \tag{36}$$

where $$c(\alpha, r_p, r_d) \tag{37}$$
$$:= \left[1 - 2\alpha \min\{r_p, r_d\} + \alpha^2(L+r_p+5G)^2 + 5\alpha^2(G+r_d)^2\right]^{\frac{1}{2}}$$

and $\sigma^{(k)}$ is defined in (30). This is hereinafter referred to as Theorem 5.

As a corollary, if $c(\alpha,r_p,r_d)<1$, then the sequence $\{z^{(k)}\}$ converges Q-linearly to $\{z^{(k,*)}\}$ up to an asymptotic error bound given by:

$$\limsup_{k \to \infty} \|z^{(k)} - z^{(k,*)}\|_2 \leq \frac{\Delta}{1-c(\alpha, r_p, r_d)} \tag{38}$$

where $\Delta := \alpha e + \sigma$.

Notice first that the condition $c(\alpha,r_p,r_d)<1$ is satisfied if $$\alpha < \frac{\min\{r_p, r_d\}}{(L+r_p+5G)^2 + 5(G+r_d)^2}. \tag{39}$$

The bound (36) provides a characterization of the discrepancy between $z^{(k,*)}$ and $z^{(k)}$ at each time $t_k$. On the other hand, the asymptotic bound (38) depends on the underlying dynamics of the distribution system through $\sigma$ and on the measurement errors through $e$. The result (38) can also be interpreted as input-to-state stability, where the optimal trajectory $\{z^{(k,*)}\}$ of the time-varying problem (12) is taken as a reference. Interestingly, when $e=0$ and $\sigma=0$, the algorithm converges to the solution of the static optimization problem (17).

As a conclusion, average tracking properties for the updates (25) and (29) should be established. To this end, some pertinent definitions and assumptions regarding DERs with discrete commands are introduced. The Voronoi cell associated with a set $\chi \subseteq \mathbb{R}^2$ and a point $x \in \chi$ is defined as $V_\chi(x):=\{y \in \mathbb{R}^2: \|x-y\| \leq \|x'-y\|, \forall x' \in \chi\}$. The following is then assumed.

Consider the collection of bounded Voronoi cells of $\chi_j^{(k)}$, $k=1, 2, \ldots$:

$$\left\{v_{\chi_j^{(k)}}(x): x \in \chi_j^{(k)}, \left|v_{\chi_j^{(k)}}(x)\right| < \infty, k=1, 2, \ldots\right\}$$

The sizes of these bounded Voronoi cells are uniformly bounded. This is hereinafter referred to as Assumption 4.

The collection $\{\text{ch } \chi_j^{(k)}, k=1, 2, \ldots\}$ is a collection of polytopes such that:
  i The sizes of the polytopes are uniformly bounded; and,
  ii The set out outgoing normal to the faces of the polytopes is finite.
This is hereinafter referred to as Assumption 5.

The following result establishes average tracking properties in terms of implementable setpoints for DERs with discrete control actions.

Under Assumptions 4 and 5, for each DER j with non-convex operational region $\chi_j^{(k)}$ there exists a finite constant $E_j$ such that $\|e_j^{(k)}\|_2 \leq E_j$ for all k. Consequently, $$\left\|\frac{1}{k}\sum_{\ell=1}^k x_j^{(\ell)} - \frac{1}{k}\sum_{\ell=1}^k \tilde{x}_j^{(\ell)}\right\|_2 \leq \frac{E_j}{k} \tag{40}$$

and $\|x_j^{(k)} - \tilde{x}_j^{(k)}\|_2 \leq 2E_j$ for all k. This is hereinafter referred to as Assumption 6.

Figure 3:
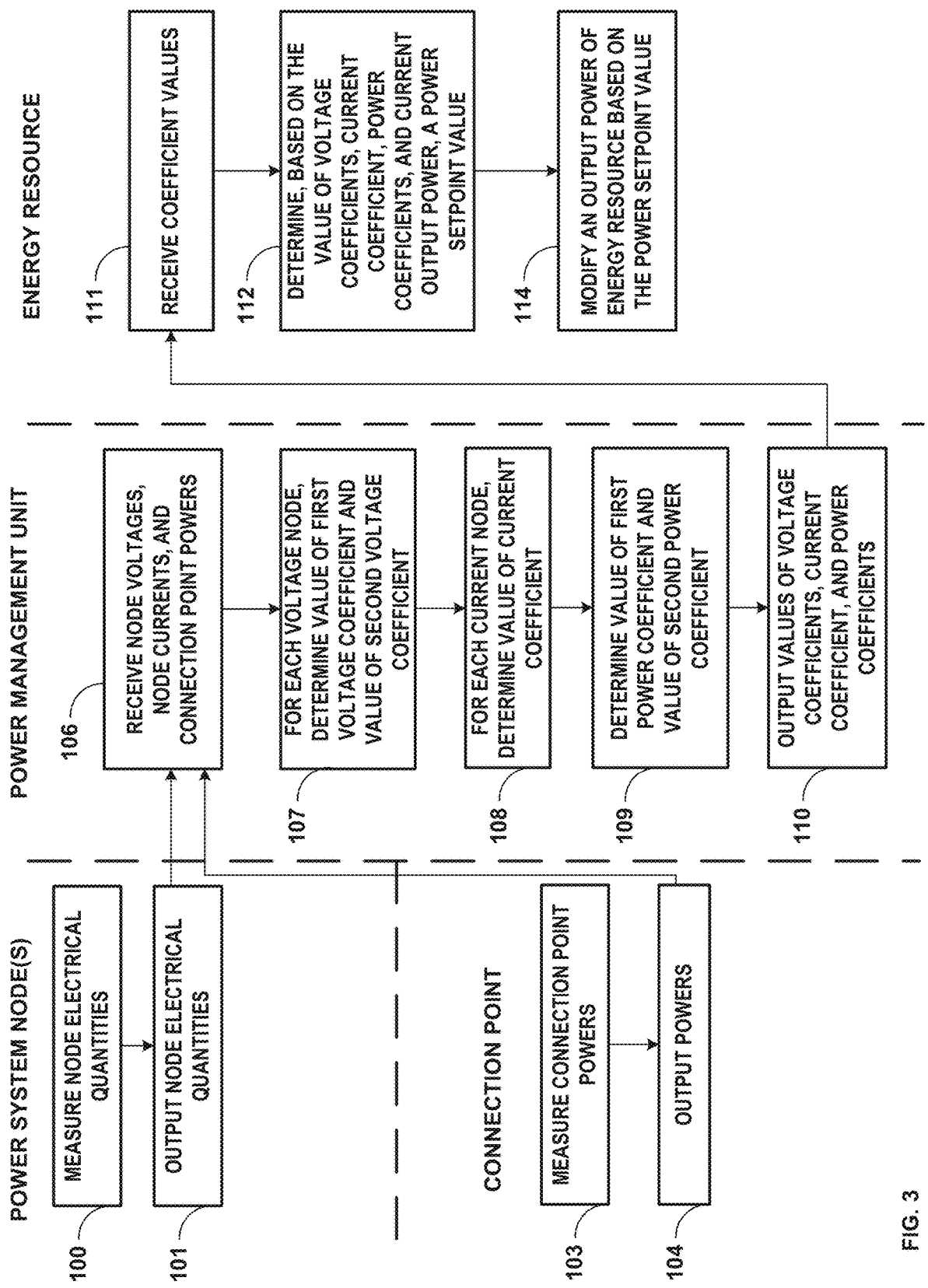
FIG. 3 is a flow diagram illustrating example operations for performing real time feedback-based optimization of distributed energy resources, in accordance with one or more aspects of the present disclosure.

FIG. 3 is a flow diagram illustrating example operations for performing real time feedback-based optimization of distributed energy resources, in accordance with one or more aspects of the present disclosure. FIG. 3 represents only one example process for performing real time feedback-based optimization of distributed energy resources as described herein, and various other or additional operations may be used in other examples. The example operations of FIG. 3 are described below within the context of FIG. 1.

In the example of FIG. 3, one or more nodes of a power system may be configured to measure, estimate, or otherwise determine node electrical quantities (100). For example, some of nodes 6 (e.g., voltage nodes) may be configured to measure node voltages. Some of nodes 6 (e.g., current nodes) may be configured to measure node currents. In other words, in some examples, each of nodes 6 may be (or include) voltage and/or current measurement devices that are capable of measuring voltages and/or currents at the respective node. Each of nodes 6 may determine respective voltage or current measurements that correspond to the different electrical phases at the node. In some examples, one or more of control devices 10 and/or other components in the power system may additionally or alternatively be configured to measure voltages and/or currents at their respective locations.

The power system nodes, in the example of FIG. 3, may each output the measured node electrical quantities (101). For instance, each of nodes 6 may transmit its respective voltage or current measurements to a power management unit via one or more wired or wireless communication networks. In other examples, nodes 6 may additionally or alternatively transmit the voltage and/or current measurements to one or more other components within system 2, such as to one or more of control devices 10, to one another, or to other components not shown in FIG. 2.

In the example of FIG. 3, a connection point of the power system (e.g., the point at which the power system connects to a larger power system) may be configured to measure, estimate, or otherwise determine connection point powers (103). For example, connection point 7 may be a power substation or other facility capable of determining the power flow at the connection point. Connection point 7 may determine power measurements that correspond to different electrical phases at the connection point.

The connection point, in the example of FIG. 3, may output the measured powers (104). For instance, connection point 7 may transmit its power measurements to the power management unit via one or more wired or wireless communication networks. In some examples, connection point 7 may additionally or alternatively transmit the power measurements to one or more other components within system 2.

In the example of FIG. 3, a power management unit may receive the node voltages, node currents, and connection point powers (106). Power management unit 4, for instance, may receive measurements 12 and power measurement 13.

For each voltage node, the power management unit may determine, based on the plurality of node voltages, a respective value of a first voltage-constraint coefficient and a respective value of a second voltage-constraint coefficient (107). For instance, power management unit 4 may determine, for each of nodes 6A and 6B (and possibly other locations), a respective value of the first voltage-constraint coefficient based on a respective previous value of the first voltage-constraint coefficient, a minimum voltage value, and the respective voltage measurement for the voltage node. Power management unit 4 may determine a respective value of the second voltage-constraint coefficient based on a respective previous value for the second voltage-constraint coefficient, a maximum voltage value, and the respective voltage measurement. In some examples, power manage- ment unit 4 may determine the respective values of the first and second voltage-constraint coefficients based addition- ally or alternatively on other criteria. In some examples, power management unit 4 may determine respective values of the first and second voltage-constraint coefficients for each phase at each voltage node. In other words, in some examples, power management unit 4 may determine values of the first and second voltage-constraint coefficients for each voltage measurement received.

For each current node, the power management unit may determine, based on the plurality of node currents, a respec- tive value of a current-constraint coefficient (108). For instance, power management unit 4 may determine, for node 6C (and possibly other locations), a respective value of the current-constraint coefficient based on a respective previous value of the current-constraint coefficient, a maximum cur- rent value, and the respective current measurement for the current node. In some examples, power management unit 4 may determine the respective values of the current-con- straint coefficients based additionally or alternatively on other criteria. In some examples, power management unit 4 may determine respective values of the current-constraint coefficients for each phase at each current node. In other words, in some examples, power management unit 4 may determine values of the current-constraint coefficient for each current measurement received.

For the connection point, the power management unit may determine, based on the power measurements, a value of a first power-constraint coefficient and a respective value of a second power-constraint coefficient (109). For instance, power management unit 4 may determine, for connection point 7 (and possibly other locations), a respective value of the first power-constraint coefficient based on a respective previous value of the first power-constraint coefficient, a power setpoint value, and the respective power measure- ment. Power management unit 4 may determine a respective value of the second power-constraint coefficient based on a respective previous value for the second power-constraint coefficient, a power setpoint value, and the respective power measurement. In some examples, power management unit 4 may determine the respective values of the first and second power-constraint coefficients based additionally or alterna- tively on other criteria. In some examples, power manage- ment unit 4 may determine respective values of the first and second power-constraint coefficients for each phase at the connection point. In other words, in some examples, power management unit 4 may determine values of the first and second power-constraint coefficients for each voltage mea- surement received.

In the example of FIG. 3, the power management unit may output the respective values of the first and second voltage- constraint coefficients, the current-constraint coefficient, and the first and second power-constraint coefficients (110). For instance, power management unit 4 may output coefficient values 14 to one or more other components of network 2 via one or more wired or wireless communication networks.

In the example of FIG. 3, one or more energy resource control devices may receive the coefficient values (111). Based on the value of the first and second voltage-constraint coefficients for each voltage node, the value of the current- constraint coefficients for each current node, and the value of the first and second power-constraint coefficients for the connection point, the one or more energy resource control devices may determine a power setpoint value (112). For example, one or more of control devices 10 may receive coefficient values 14 and determine a power setpoint value for the corresponding energy resource or resources 8 based on the coefficient values. In some examples, control devices 10 may determine the power setpoint value based additionally or alternatively on other criteria, such as one or more performance metrics. The performance metrics may be defined by a manager and/or owner of the corresponding energy resource(s) and/or by a manager/operator of the power system. Examples of performance metrics include a metric indicating cost for ancillary service provisioning, a metric indicating feed-in tariffs, and other metrics.

Based on the power setpoint value, the one or more energy resource control devices may, in the example of FIG. 3, modify an output power of an associated energy resource (114). For example, control device 10A may modify output powers of energy resource 8A. In various examples, modifying the output power may represent modifying a real output power, a reactive output power, or both.

The example operations of FIG. 3 may be performed in an iterative fashion. That is, while only a single flow is shown, each of operations 100, 101, 103, 104, 106, 107, 108, 109, 110, 111, 112, and/or 114 may be performed any number of times. In some examples, the operations may be performed periodically. In some such examples, the frequency with which these operations are performed may be the same. In other such examples, one or more of the operations may be performed with higher or lower frequency than other operations.

Additionally, while shown in the example of FIG. 3 as being performed by specific components, operations 100, 101, 103, 104, 106, 107, 108, 109, 110, 111, 112, and/or 114 may, in other examples, be performed by components other than those indicated. For instance, in some examples operations 106, 107, 108, 109, 110, 111, 112, and 114 may all be performed by the power management unit. An additional variation of the techniques described herein is described below with respect to FIG. 4.

Figure 4:
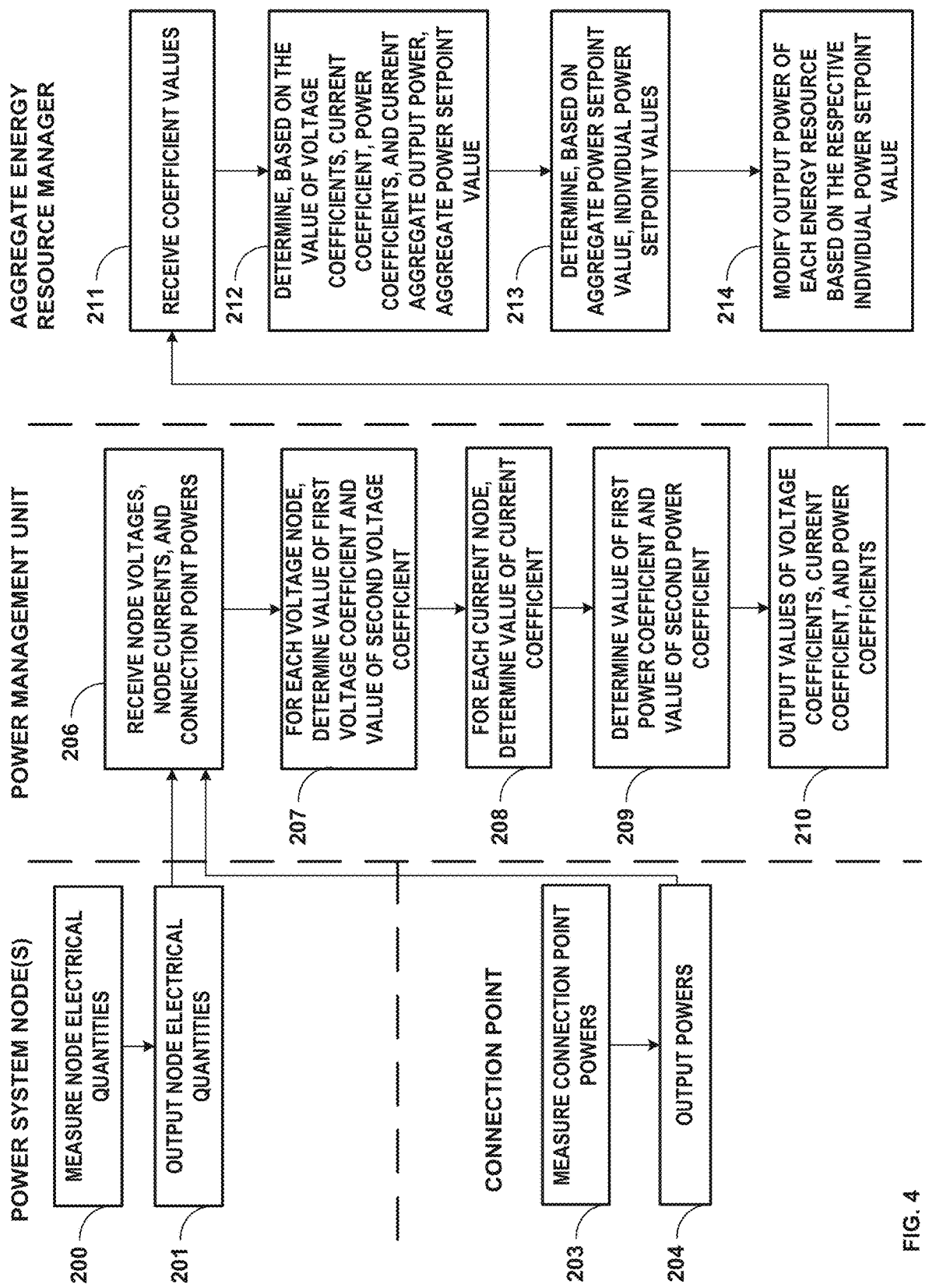
FIG. 4 is a flow diagram illustrating example operations for performing real time feedback-based optimization of distributed energy resources, in accordance with one or more aspects of the present disclosure.

FIG. 4 is a flow diagram illustrating example operations for regulating voltage through gather and broadcast techniques, in accordance with one or more aspects of the present disclosure. FIG. 4 represents only one example process for performing real time feedback-based optimization of distributed energy resources as described herein, and various other or additional operations may be used in other examples. The example operations of FIG. 4 are described below within the context of FIG. 1.

In the example of FIG. 4, operations 200, 201, 203, 204, 206, 207, 208, 209, and 210, are substantially the same as operations 100, 101, 103, 104, 106, 107, 108, 109, and 110, respectively, as described with respect to FIG. 3. In FIG. 4, however, power management unit 4 may transmit coefficient values 14 to a control device that manages more than one energy resource, such as control device 10B as shown in FIG. 1.

The aggregate energy resource manager may receive the coefficient values (211) and determine an aggregate power setpoint value based on the values of the first and second voltage-constraint coefficients, the values of the current-constraint coefficients, the values of the first and second power-constraint coefficients, and a current aggregate output power (212). For instance, control device 10B may determine the aggregate power setpoint value based in part on the aggregate power output of energy resources 8B, 8C, and 8D.

In the example of FIG. 3, the aggregate energy resource manager may determine individual power setpoint values based on the aggregate power setpoint value (213). For example, control device 10B may determine individual power setpoint values for each of energy resources 8B, 8C, and 8D. The aggregate energy resource manager may then modify the output power of each energy resource based on the respective individual power setpoint value (214). For instance, control device 10B may individually modify the output power of energy resource 8B, energy resource 8C, and energy resource 8D based on the individual power setpoint values.

As in FIG. 3, the example operations of FIG. 4 may be performed in an iterative fashion. Furthermore, while shown in the example of FIG. 4 as being performed by specific components, at least some of the operations may be performed by other components in system 2 or by other components.

Figure 5:
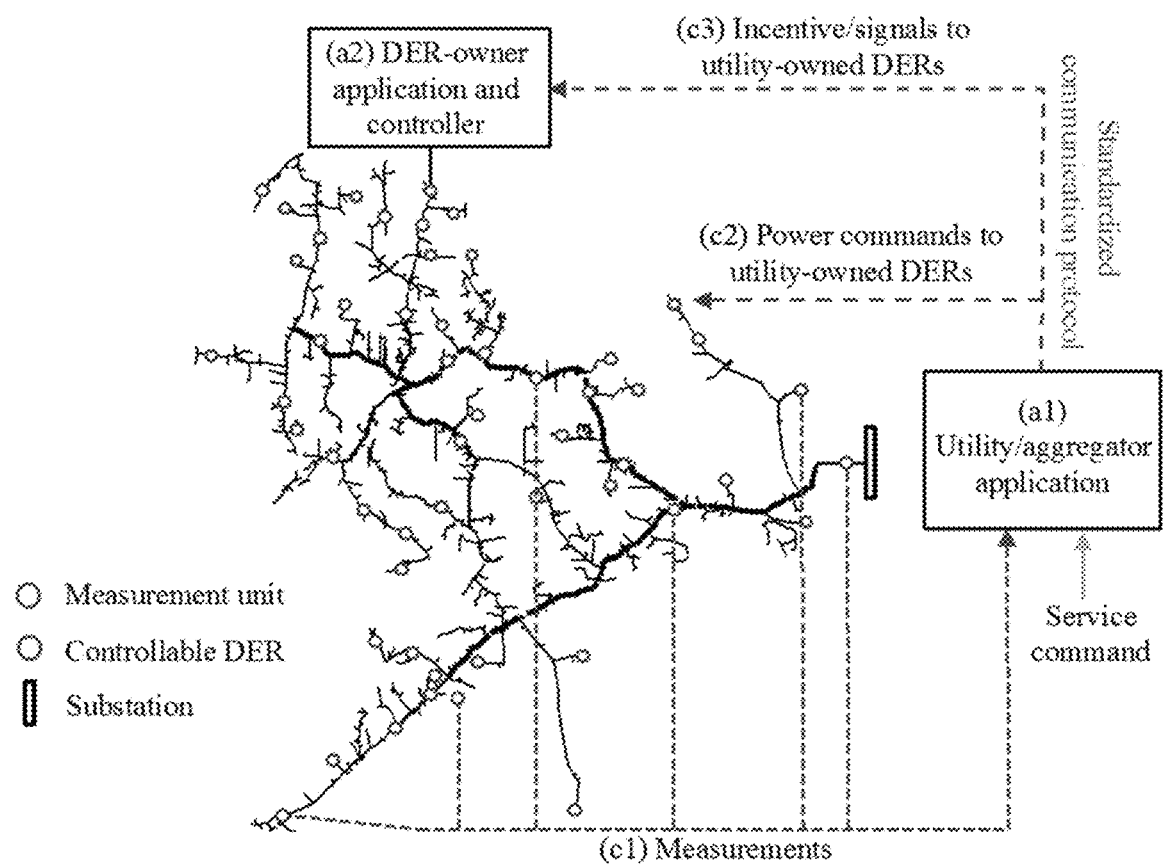
FIG. 5 is a conceptual diagram illustrating another example power management system configured to manage distributed energy resources in a power system, in accordance with one or more aspects of the present disclosure.

FIG. 5 illustrates an additional example of a distribution system configured to implement one or more techniques of the present disclosure. The techniques described herein may be used in the system of FIG. 5 to address unique needs of utilities companies, aggregators, and DER-owners. The systems, devices, and methods of the present disclosure may unify real-time voltage and frequency control at the home/building/DER controllers' level with network-wide power management at the utility/aggregator level. Additionally, these systems, devices, and methods may collectively enable feeders to emulate virtual power plants providing services to the main grid at multiple temporal scales. The framework detailed herein offers responsiveness to rapidly changing conditions by incorporating intrinsic network physics into the control-law formulation and processing real-time measurements.

Example implementation settings and devices are outlined below with respect to the illustrative system in FIG. 5.

One example system includes a utility control platform. Such a system may include implementation of operations (a1), (c1), and (c2), as shown in FIG. 5. This system may offer an optimization and control platform for utility companies/distribution system operators for real-time control of utility-owned DERs deployed in feeders. The optimization and control platform can be designed to pursue network-level objectives such as voltage regulation, power loss minimization, and net-load smoothing, while respecting circuit laws, voltage limits, ramping constraints, and other limits. Responsiveness to high-level commands, such as those originating from an independent system operator, is also possible. The control platform can be utilized by utility companies/distribution-system operators to also control customer-owned DERs (e.g., provided that contractual agreements are in place). The control methods of such a system can be encoded into a software package implementable in various computing devices. Such a software package could afford a number of distinct installations, as exampled below.

In one example, existing Advanced Distribution Management Systems (ADMSs) may not support functionalities for real-time control of DERs and may typically send dispatch commands to the devices only at a slow time scale (e.g., every 5 minutes, every 10 minutes, or at some other frequency). The systems, devices, and methods detailed herein may be embedded into such existing ADMSs to enable real-time control of utility-controlled DERs (e.g., the DER power outputs can be adjusted on the order of seconds, sub-seconds, etc.). The forecasting and state estimation modules of existing ADMS may be interfaced with the control software to provide inputs to the controllers. The power commands produced by the control software can be sent to the DERs by leveraging existing communication functionalities of the ADMS as well as standardized communication protocols (e.g., DNP3 via TCP/IP, Modbus via TCP/IP, and others). This framework can be extended to manage conventional devices, such as tap-changers and capacitor banks, in addition to emerging DER types.

In another example, the control software for the system may be embedded into a standalone computational device (e.g., a control device) that directly interacts with DERs. The control device may interact with the ADMS (if deployed) to gather information regarding the distribution system state. Such communication with the ADMS may be standardized, e.g., via a new communication protocol. In some examples, emphasis may be placed on compatibility of the control devices with existing ADMS structures used by utilities.

Additionally or alternatively, the system's control platform can be enhanced to communicate directly with phasor measurement units to gather measurements, and to implement state estimation and forecasting algorithms. Communication with DERs can be performed via standardized protocols (e.g., DNP3 via TCP/IP, Modbus via TCP/IP, etc.).

Another example system includes an aggregator control platform. Such a system may also include implementation of operations (a1), (c1), and (c2) as shown in FIG. 5. This system may offer an optimization and control platform for aggregators, to enable real-time control of DERs deployed in a portion of the distribution system. Example portions of the distribution system include residential neighborhoods, communities, urban environments, and others. The aggregator control platform may implement the optimization and control methods described herein and may interface directly with the DERs via standardized communications. In some examples, the control devices may be designed to pursue objectives such as voltage regulation, power loss minimization, and maximization of renewable utilization. Another example objective may be to respond to commands sent from the utility company to regulate the power flows at the aggregator-utility interface.

In such a system, control devices may interact with the ADMS (if deployed) to gather information regarding the distribution system state. In some examples, the communication protocol to communicate with the ADMS may be standardized. In some examples, the control platform may be enhanced to implement state estimation and forecasting algorithms to improve performance.

Another example system includes a distributed control platform. Such a system may include implementation of operations (a1), (a2), (c1), (c2), and (c3) as shown in FIG. 5. In such a system, the examples above may be complemented by a customer-level control device and a communication link (e.g., (c3)) between the customer-level control device and the utility/aggregator control device. The customer-level control device may manage the behind-the-meter DERs based on, for example, 1) local objective functions that are flexibly defined by end-users to accommodate multiple interests and 2) global signals that are broadcasted by the utility/aggregator control device (e.g., via (c3)) to incentivize DERs to adjust the power output to achieve global voltage regulation and ancillary service requests. The customer may be able to adjust and set a balance between these preferences via a user-interface. In some examples, in order to preserve privacy, customer's preferences may not be shared with the utility/aggregator.

The design of this system may better respect the computational capabilities of typical microcontrollers (e.g., as in micro-inverters) and may affords a low-cost hardware implementation. Various user preferences may be specified within the scope of this disclosure, and implementation of the techniques described herein may use existing microcontroller boards or custom-designed hardware.

The communication link (c3) may be designed based on standardized protocols (e.g., UDP) and may include cyber-protection applications to prevent cyberattacks. Depending on the goals of the specific system, the customer-level DER-control devices may be either commercially available devices (e.g., devices already used by current DER manufacturers that are reconfigured), or, other computing devices, such as custom hardware. In the second case, the customer-level DER-control device may communicate with the DERs via standardized protocols (e.g., DNP3 via TCP/IP, Modbus via TCP/IP, etc.).

In some instances, the three example systems described with respect to FIG. 5 may seamlessly coexist in the same distribution network. This does not preclude the existence of aggregators in circuits that deploy a utility control platform and, vice versa, may allow utilities, aggregators, and end customers to pursue their own operational objectives, while naturally achieving global coordination to satisfy reliability constraints and enable feeders to provide services to the main grid.

The present disclosure allows for distribution networks featuring distributed energy resources (DERs), and provides a system-theoretic control framework that may allow distribution networks to emulate virtual power plants effectively providing services at the interface with the transmission grid. The controller devices described herein may adjust the output powers of individual DERs in response to automatic generation control and regulation services, while concurrently regulating voltages, currents, and powers within the feeder and maximizing customers' and utility's performance objectives. The control paradigm described herein may afford both a centralized and a distributed implementation, and their design is grounded on suitable linearizations of the AC power-flow equations as well as online primal-dual-type methods for time-varying optimization problems. Convergence and tracking capabilities of the provided controller devices have been analytically established under suitable modeling assumptions. Simulations have also been provided to validate the disclosed systems, devices, and methods.

At least some of the techniques of the present disclosure may be additionally or alternatively described by one or more of the following examples.

Example 1. A device comprising: at least one processor configured to: receive a plurality of voltage values, wherein voltage values in the plurality of voltage values correspond to respective voltage nodes in a plurality of voltage nodes in a first portion of a power system; determine, for each respective voltage node: a respective value of a first voltage-constraint coefficient, based on a respective previous value of the first voltage-constraint coefficient, a minimum voltage value, and a respective voltage value in the plurality of voltage values that corresponds to the respective voltage node; and a respective value of a second voltage-constraint coefficient based on a respective previous value of the second voltage-constraint coefficient, a maximum voltage value, and the respective voltage value; receive a power value corresponding to a connection point of the first portion of the power system with a second portion of the power system; determine for the connection point: a value of a first power-constraint coefficient, based on a previous value of the first power-constraint coefficient, a power setpoint for the connection point, and the power value; and a value of a second power-constraint coefficient based on a previous value of the second power-constraint coefficient, the power setpoint for the connection point, and the power value; and cause at least one energy resource in a plurality of energy resources that are connected to the first portion of the power system to modify an output power of the at least one energy resource based on the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

Example 2. The device of example 1, wherein: the at least one processor is further configured to: receive a plurality of current values, wherein current values in the plurality of current values correspond to respective current nodes in a plurality of current nodes in the first portion of the power system; and determine, for each respective current node, a respective value of a current-constraint coefficient, based on a respective previous value of the current-constraint coefficient, a respective maximum current value for the respective current node, and a respective current value in the plurality of current values that corresponds to the respective current node, and causing the at least one energy resource to modify the output power of the at least one energy resource comprises causing the at least one energy resource to modify the output power of the at least one energy resource based further on the respective value of the current-constraint coefficient for each respective current node.

Example 3. The device of either of examples 1 or 2, wherein causing the at least one energy resource to modify the output power comprises outputting, to the at least one energy resource, the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

Example 4. The device of any of examples 1-3, wherein: each voltage value in the plurality of voltage values comprises a set of voltage values, each corresponding to a respective phase at the respective voltage node, and the power value comprises a set of power values, each corresponding to a respective phase at the connection point.

Example 5. The device of example 4, wherein: determining the respective value of the first voltage-constraint coefficient comprises determining a set of respective values of the first voltage-constraint coefficient, each respective value in the set of respective values of the first voltage-constraint coefficient corresponding to the respective phase at the respective voltage node; determining the respective value of the second voltage-constraint coefficient comprises determining a set of respective values of the second voltage-constraint coefficient, each respective value in the set of respective values of the second voltage-constraint coefficient corresponding to the respective phase at the respective voltage node; determining the value of the first power-constraint coefficient comprises determining a set of respective values of the first power-constraint coefficient, each respective value in the set of respective values of the first power-constraint coefficient corresponding to the respective phase at the connection point; and determining the value of the second power-constraint coefficient comprises determining a set of respective values of the second power-constraint coefficient, each respective value in the set of respective values of the second power-constraint coefficient corresponding to the respective phase at the connection point.

Example 6. The device of any of examples 1-5, wherein: determining the respective value of the first voltage-constraint coefficient comprises: determining, based on the respective previous value of the first voltage-constraint coefficient, the minimum voltage value, and the respective voltage value in the plurality of voltage values that corresponds to the respective voltage node, a respective first voltage coefficient offset value; scaling the respective first voltage coefficient offset value by a step size to determine a respective scaled first voltage coefficient offset value; responsive to determining that a respective first sum of the respective previous value of the first voltage-constraint coefficient and the respective scaled first voltage coefficient offset value is greater than zero, setting the respective value of the first voltage-constraint coefficient to be the respective first sum; and responsive to determining that the respective first sum is less than or equal to zero, setting the respective value of the first voltage-constraint coefficient to be zero, determining the respective value of the second voltage-constraint coefficient comprises: determining, based on the respective previous value of the second voltage-constraint coefficient, the maximum voltage value, and the respective voltage value in the plurality of voltage values that corresponds to the respective voltage node, a respective second voltage coefficient offset value; scaling the respective second voltage coefficient offset value by the step size to determine a respective scaled second voltage coefficient offset value; responsive to determining that a respective second sum of the respective previous value of the second voltage-constraint coefficient and the respective scaled second voltage coefficient offset value is greater than zero, setting the respective value of the second voltage-constraint coefficient to be the respective second sum; and responsive to determining that the respective second sum is less than or equal to zero, setting the respective value of the second voltage-constraint coefficient to be zero, determining the value of the first power-constraint coefficient comprises: determining, based on the previous value of the first power-constraint coefficient, the power setpoint for the connection point, an accuracy value, and the power value, a first power coefficient offset value; scaling the first power coefficient offset value by the step size to determine a scaled first power coefficient offset value; and responsive to determining that a third sum of the previous value of the first power-constraint coefficient and the scaled first power coefficient offset value is greater than zero, setting the value of the first power-constraint coefficient to be the third sum; and responsive to determining that the third sum is less than or equal to zero, setting the value of the first power-constraint coefficient to be zero, and determining the value of the second power-constraint coefficient comprises: determining, based on the previous value of the second power-constraint coefficient, the power setpoint for the connection point, the accuracy value, and the power value, a second power coefficient offset value; scaling the second power coefficient offset value by the step size to determine a scaled second power coefficient offset value; responsive to determining that a fourth sum of the previous value of the second power-constraint coefficient and the scaled second power coefficient offset value is greater than zero, setting the value of the second power-constraint coefficient to be the fourth sum; and responsive to determining that the fourth sum is less than or equal to zero, setting the value of the second power-constraint coefficient to be zero.

Example 7. The device of any of examples 1-6, wherein: determining the respective value of the first voltage-constraint coefficient comprises calculating $\text{proj}_{\mathbb{R}_+}\{\gamma^{(k)}+\alpha(v^{min}-|\hat{v}^{(tk)}|-r_d\gamma^{(k)}\}$, wherein: $\gamma^{(k)}$ represents the respective previous value of the first voltage-constraint coefficient, $v^{min}$ represents the respective minimum voltage value for the respective voltage node, $\hat{v}^{(tk)}$ represents the respective voltage value that corresponds to the respective voltage node, a represents a step size, and $r_d$ represents a parameter indicating an importance of previous constraint coefficient values, determining the respective value of the second voltage-constraint coefficient comprises calculating $\text{proj}_{\mathbb{R}_+} \{\mu^{(k)} + \alpha (|\hat{v}^{(tk)}| - v^{max} - r_d \mu^{(k)})\}$, wherein: $\mu^{(k)}$ represents the respective previous value of the second voltage-constraint coefficient, and $v^{max}$ represents the respective maximum voltage value for the respective voltage node, determining the value of the first power-constraint coefficient comprises calculating $\text{proj}_{\mathbb{R}_+} \{\lambda^{(k)} + \alpha(\hat{p}_0^{(k)} - p_{0,set}^{(k)} - E^{(k)} - r_d \lambda^{(k)})\}$, wherein: $\lambda^{(k)}$ represents the previous value of the first power-constraint coefficient, $p_{0,set}^{(k)}$ represents the power setpoint for the connection point, $\hat{p}_0^{(k)}$ represents the power value that corresponds to the connection point, and $E^{(k)}$ represents an accuracy value, and determining the value of the second power-constraint coefficient comprises calculating $\text{proj}_{\mathbb{R}_+^2} \{v^{(k)} + \alpha(p_{0,set}^{(k)} - \hat{p}_0^{(k)} - E^{(k)} - r_d v^{(k)})\}$, wherein: $v^{(k)}$ represents the previous value of the second power-constraint coefficient.

Example 8. The device of any of examples 1-7, wherein causing the at least one energy resource to modify the output power comprises: determining, for the at least one energy resource, a respective power setpoint value, based on the respective value of the first voltage-constraint coefficient for each respective node, the respective value of the second voltage-constraint coefficient for each respective node, the value of the first power-constraint coefficient, the value of the second power-constraint coefficient, and a respective output power value of the at least one energy resource; and causing the at least one energy resource to modify the output power based on the respective power setpoint.

Example 9. The device of any of examples 1-8, wherein: the at least one energy resource comprises an aggregation of energy resources, and causing the aggregation of energy resources to modify the output power comprises: determining, for the aggregation of energy resources, a respective aggregate power setpoint value, based on the respective value of the first voltage-constraint coefficient for each respective node, the respective value of the second voltage-constraint coefficient for each respective node, the value of the first power-constraint coefficient, the value of the second power-constraint coefficient, and a respective aggregate output power value of the aggregate energy resource; determining, based on the respective aggregate power setpoint value and a cost associated with each energy resource in the aggregation of energy resources, respective individual power setpoint values for each energy resource in the aggregation of energy resources; and causing each energy resource in the aggregation of energy resources to modify a respective output power based on the respective individual power setpoint values.

Example 10. A system comprising: a power management system configured to: receive, from each of a plurality of voltage measurement devices, a respective voltage value that corresponds to a respective voltage node in a plurality of voltage nodes in a first portion of a power system; receive a power value that corresponds to a connection point at which the first portion of the power system connects to a second portion of the power system; determine, for each respective voltage node in the plurality of voltage nodes: a respective value of a first voltage-constraint coefficient, based on a respective previous value of the first voltage-constraint coefficient, a minimum voltage value, and the respective voltage value; and a respective value of a second voltage-constraint coefficient based on a respective previous value of the second voltage-constraint coefficient, a maximum voltage value, and the respective voltage value; determine, for the connection point: a value of a first power-constraint coefficient, based on a previous value of the first power-constraint coefficient, a power setpoint for the connection point, and the power value; and a value of a second power-constraint coefficient, based on a previous value of the second power-constraint coefficient, the power setpoint for the connection point, and the power value; and output the respective value of the first voltage-constraint coefficient for each respective voltage node, the respective value of the second voltage-constraint coefficient for each respective voltage node, the value of the first power-constraint coefficient, and the value of the second power-constraint coefficient; and a plurality of energy resource management devices, each corresponding to a respective at least one energy resource connected to the power system, each energy resource management device being configured to: receive the respective value of the first voltage-constraint coefficient for each respective voltage node, the respective value of the second voltage-constraint coefficient for each respective voltage node, the value of the first power-constraint coefficient, and the value of the second power-constraint coefficient; determine, based on the respective value of the first voltage-constraint coefficient for each respective voltage node, the respective value of the second voltage-constraint coefficient for each respective voltage node, the value of the first power-constraint coefficient, and the value of the second power-constraint coefficient, a respective power setpoint value; and modify a respective output power of the respective at least one energy resource, based on the respective power setpoint value.

Example 11. The system of example 10, wherein the power management system is further configured to: receive, from each of a plurality of current measurement devices, a respective current value that corresponds to a respective current node in a plurality of current nodes in the first portion of the power system; determine, for each respective current node in the plurality of current nodes, a respective value of a current-constraint coefficient, based on a respective previous value of the current-constraint coefficient, a maximum current value, and the respective current value; and output the respective value of the current-constraint coefficient for each respective current node, and each energy resource management device is further configured to: receive the respective value of the current-constraint coefficient for each respective current node; and determine the respective power setpoint value based additionally on the respective value of the current-constraint coefficient for each respective current node.

Example 12. The system of either of examples 10 or 11, wherein: the respective voltage value comprises a respective set of voltage values, each corresponding to a respective phase at the respective voltage node, and the power value comprises a set of power values, each corresponding to a respective phase at the connection point.

Example 13. The system of example 12, wherein: determining the respective value of the first voltage-constraint coefficient comprises determining a set of respective values of the first voltage-constraint coefficient, each respective value in the set of respective values of the first voltage-constraint coefficient corresponding to the respective phase at the respective voltage node; determining the respective value of the second voltage-constraint coefficient comprises determining a set of respective values of the second voltage-constraint coefficient, each respective value in the set of respective values of the second voltage-constraint coefficient corresponding to the respective phase at the respective voltage node; determining the value of the first power-constraint coefficient comprises determining a set of respective values of the first power-constraint coefficient, each respective value in the set of respective values of the first power-constraint coefficient corresponding to the respective phase at the connection point; and determining the value of the second power-constraint coefficient comprises determining a set of respective values of the second power-constraint coefficient, each respective value in the set of respective values of the second power-constraint coefficient corresponding to the respective phase at the connection point.

Example 14. The system of any of examples 10-13, wherein a first energy resource management device in the plurality of energy resource management devices manages an aggregation of energy resources, the first energy resource management device being configured to: determine, based on the respective power setpoint value for the first energy resource management device and a cost associated with each energy resource in the aggregation of energy resources, respective individual power setpoint values for each energy resource in the aggregation of energy resources; and modify the respective output power of the aggregation of energy resources by modifying a respective individual output power of each energy resource in the aggregation of energy resources based on the respective individual power setpoint.

Example 15. The system of any of examples 10-14, wherein at least one of the plurality of energy resource management devices comprises a power inverter that couples the respective at least one energy resource to the distribution network.

Example 16. The system of any of examples 10-15, wherein: determining the respective value of the first voltage-constraint coefficient comprises: determining, based on the respective previous value of the first voltage-constraint coefficient, the minimum voltage value, and the respective voltage value in the plurality of voltage values that corresponds to the respective voltage node, a respective first voltage coefficient offset value; scaling the respective first voltage coefficient offset value by a step size to determine a respective scaled first voltage coefficient offset value; responsive to determining that a respective first sum of the respective previous value of the first voltage-constraint coefficient and the respective scaled first voltage coefficient offset value is greater than zero, setting the respective value of the first voltage-constraint coefficient to be the respective first sum; and responsive to determining that the respective first sum is less than or equal to zero, setting the respective value of the first voltage-constraint coefficient to be zero, determining the respective value of the second voltage-constraint coefficient comprises: determining, based on the respective previous value of the second voltage-constraint coefficient, the maximum voltage value, and the respective voltage value in the plurality of voltage values that corresponds to the respective voltage node, a respective second voltage coefficient offset value; scaling the respective second voltage coefficient offset value by the step size to determine a respective scaled second voltage coefficient offset value; responsive to determining that a respective second sum of the respective previous value of the second voltage-constraint coefficient and the respective scaled second voltage coefficient offset value is greater than zero, setting the respective value of the second voltage-constraint coefficient to be the respective second sum; and responsive to determining that the respective second sum is less than or equal to zero, setting the respective value of the second voltage-constraint coefficient to be zero, determining the value of the first power-constraint coefficient comprises: determining, based on the previous value of the first power-constraint coefficient, the power setpoint for the connection point, an accuracy value, and the power value, a first power coefficient offset value; scaling the first power coefficient offset value by the step size to determine a scaled first power coefficient offset value; and responsive to determining that a third sum of the previous value of the first power-constraint coefficient and the scaled first power coefficient offset value is greater than zero, setting the value of the first power-constraint coefficient to be the third sum; and responsive to determining that the third sum is less than or equal to zero, setting the value of the first power-constraint coefficient to be zero, and determining the value of the second power-constraint coefficient comprises: determining, based on the previous value of the second power-constraint coefficient, the power setpoint for the connection point, the accuracy value, and the power value, a second power coefficient offset value; scaling the second power coefficient offset value by the step size to determine a scaled second power coefficient offset value; responsive to determining that a fourth sum of the previous value of the second power-constraint coefficient and the scaled second power coefficient offset value is greater than zero, setting the value of the second power-constraint coefficient to be the fourth sum; and responsive to determining that the fourth sum is less than or equal to zero, setting the value of the second power-constraint coefficient to be zero.

Example 17. The system of any of examples 10-16, further comprising the plurality of voltage measurement devices, each configured to: determine the respective voltage value; and output the respective voltage value.

Example 18. A method comprising: receiving, by a power management system comprising at least one processor, a plurality of voltage values, wherein voltage values in the plurality of voltage values correspond to respective voltage nodes in a plurality of voltage nodes in a first portion of a power system; determining, by the power management system and for each respective voltage node: a respective value of a first voltage-constraint coefficient, based on a respective previous value of the first voltage-constraint coefficient, a minimum voltage value, and a respective voltage value in the plurality of voltage values that corresponds to the respective voltage node; and a respective value of a second voltage-constraint coefficient based on a respective previous value of the second voltage-constraint coefficient, a maximum voltage value, and the respective voltage value; receiving, by the power management system, a power value corresponding to a connection point of the first portion of the power system with a second portion of the power system; determining, by the power management system and for the connection point: a value of a first power-constraint coefficient, based on a previous value of the first power-constraint coefficient, a power setpoint for the connection point, and the power value; and a value of a second power-constraint coefficient based on a previous value of the second power-constraint coefficient, the power setpoint for the connection point, and the power value; and causing, by the power management system, at least one energy resource in a plurality of energy resources that are connected to the first portion of the power system to modify an output power of the at least one energy resource based on the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

Example 19. The method of example 18, wherein causing the at least one energy resource to modify the output power comprises outputting, to the at least one energy resource, the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

Example 20. The method of either of examples 18 or 19, further comprising: receiving a plurality of current values, wherein current values in the plurality of current values correspond to respective current nodes in a plurality of current nodes in the first portion of the power system; determining, for each respective current node, a respective value of a current-constraint coefficient, based on a respective previous value of the current-constraint coefficient, a respective maximum current value for the respective current node, and a respective current value in the plurality of current values that corresponds to the respective current node, wherein causing the at least one energy resource to modify the output power of the at least one energy resource comprises causing the at least one energy resource to modify the output power of the at least one energy resource based further on the respective value of the current-constraint coefficient for each respective current node.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
at least one processor configured to:
 receive a power value corresponding to a connection point of a first portion of a power system with a second portion of the power system;
 determine for the connection point:
  a value of a first power-constraint coefficient, based on a previous value of the first power-constraint coefficient, a power setpoint for the connection point, and the power value; and
  a value of a second power-constraint coefficient based on a previous value of the second power-constraint coefficient, the power setpoint for the connection point, and the power value; and
 cause at least one energy resource in a plurality of energy resources that are connected to the first portion of the power system to modify an output power of the at least one energy resource based on the respective value of the value of the first power-constraint coefficient for the connection point and the value of the second power-constraint coefficient for the connection point.

2. The device of claim 1, wherein:
the at least one processor is further configured to:
 receive a plurality of current values, wherein current values in the plurality of current values correspond to respective current nodes in a plurality of current nodes in the first portion of the power system; and
determine, for each respective current node, a respective value of a current-constraint coefficient, based on a respective previous value of the current-constraint coefficient, a respective maximum current value for the respective current node, and a respective current value in the plurality of current values that corresponds to the respective current node, and
causing the at least one energy resource to modify the output power of the at least one energy resource comprises causing the at least one energy resource to modify the output power of the at least one energy resource based further on the respective value of the current-constraint coefficient for each respective current node.

3. The device of claim 1, wherein causing the at least one energy resource to modify the output power comprises outputting, to the at least one energy resource, the value of the first power-constraint coefficient for the connection point and the value of the second power-constraint coefficient for the connection point.

4. The device of claim 1, wherein the power value comprises a set of power values, each corresponding to a respective phase at the connection point.

5. The device of claim 4, wherein:
determining the value of the first power-constraint coefficient comprises determining a set of respective values of the first power-constraint coefficient, each respective value in the set of respective values of the first power-constraint coefficient corresponding to the respective phase at the connection point; and
determining the value of the second power-constraint coefficient comprises determining a set of respective values of the second power-constraint coefficient, each respective value in the set of respective values of the second power-constraint coefficient corresponding to the respective phase at the connection point.

6. The device of claim 1, wherein:
determining the value of the first power-constraint coefficient comprises:
determining, based on the previous value of the first power-constraint coefficient, the power setpoint for the connection point, an accuracy value, and the power value, a first power coefficient offset value;
scaling the first power coefficient offset value by a step size to determine a scaled first power coefficient offset value; and
responsive to determining that a first sum of the previous value of the first power-constraint coefficient and the scaled first power coefficient offset value is greater than zero, setting the value of the first power-constraint coefficient to be the first sum; and
responsive to determining that the first sum is less than or equal to zero, setting the value of the first power-constraint coefficient to be zero, and determining the value of the second power-constraint coefficient comprises:
determining, based on the previous value of the second power-constraint coefficient, the power setpoint for the connection point, the accuracy value, and the power value, a second power coefficient offset value;
scaling the second power coefficient offset value by the step size to determine a scaled second power coefficient offset value; and
responsive to determining that a second sum of the previous value of the second power-constraint coefficient and the scaled second power coefficient offset value is greater than zero, setting the value of the second power-constraint coefficient to be the second sum; and
responsive to determining that the second sum is less than or equal to zero, setting the value of the second power-constraint coefficient to be zero.

7. The device of claim 1, wherein:
determining the value of the first power-constraint coefficient comprises calculating $\text{proj}_{\mathbb{R}_+}\{\lambda^{(k)}+\alpha(\hat{p}_0^{(k)}-p_{0,set}^{(k)}-E^{(k)}-r_d\lambda^{(k)})\}$, wherein:
$\lambda^{(k)}$ represents the previous value of the first power-constraint coefficient,
$p_{0,set}^{(k)}$ represents the power setpoint for the connection point,
$\hat{p}_0^{(k)}$ represents the power value that corresponds to the connection point,
$\alpha$ represents a step size,
$r_d$ represents a parameter indicating an importance of previous constraint coefficient values, and
$E^{(k)}$ represents an accuracy value, and
determining the value of the second power-constraint coefficient comprises calculating $$\text{proj}_{\mathbb{R}_+^3}\{v^{(k)}+\alpha(p_{0,set}^{(k)}-\hat{p}_0^{(k)}-E^{(k)}-r_d v^{(k)})\},$$

wherein:
$v^{(k)}$ represents the previous value of the second power-constraint coefficient.

8. The device of claim 1, wherein causing the at least one energy resource to modify the output power comprises:
determining, for the at least one energy resource, a respective power setpoint value, based on the value of the first power-constraint coefficient, the value of the second power-constraint coefficient, and a respective output power value of the at least one energy resource; and
causing the at least one energy resource to modify the output power based on the respective power setpoint.

9. The device of claim 1, wherein:
the at least one energy resource comprises an aggregation of energy resources, and
causing the aggregation of energy resources to modify the output power comprises:
determining, for the aggregation of energy resources, a respective aggregate power setpoint value, based on the value of the first power-constraint coefficient, the value of the second power-constraint coefficient, and a respective aggregate output power value of the aggregate energy resource;
determining, based on the respective aggregate power setpoint value and a cost associated with each energy resource in the aggregation of energy resources, respective individual power setpoint values for each energy resource in the aggregation of energy resources; and
causing each energy resource in the aggregation of energy resources to modify a respective output power based on the respective individual power setpoint values.

10. The device of claim 1, wherein:
the at least one processor is further configured to:
receive a plurality of voltage values, wherein voltage values in the plurality of voltage values represent respective voltage magnitudes at respective voltage nodes in a plurality of voltage nodes in the first portion of the power system;

determine, for each respective voltage node:
- a respective value of a first voltage-constraint coefficient, based on a respective previous value of the first voltage-constraint coefficient, a minimum voltage value, and a respective voltage value in the plurality of voltage values that corresponds to the respective voltage node; and
- a respective value of a second voltage-constraint coefficient based on a respective previous value of the second voltage-constraint coefficient, a maximum voltage value, and the respective voltage value, wherein the minimum voltage value for the respective node and the maximum voltage value for the respective node represent a defined allowable voltage range at the respective node; and causing the at least one energy resource to modify the output power of the at least one energy resource comprises causing the at least one energy resource to modify the output power of the at least one energy resource based further on the respective value of the first voltage-constraint coefficient for each respective voltage node and the respective value of the second voltage-constraint coefficient for each respective voltage node.

11. The device of claim 10, wherein:
the at least one processor is further configured to:
receive a plurality of current values, wherein current values in the plurality of current values correspond to respective current nodes in a plurality of current nodes in the first portion of the power system; and
determine, for each respective current node, a respective value of a current-constraint coefficient, based on a respective previous value of the current-constraint coefficient, a respective maximum current value for the respective current node, and a respective current value in the plurality of current values that corresponds to the respective current node, and
causing the at least one energy resource to modify the output power of the at least one energy resource comprises causing the at least one energy resource to modify the output power of the at least one energy resource based further on the respective value of the current-constraint coefficient for each respective current node.

12. The device of claim 10, wherein causing the at least one energy resource to modify the output power comprises outputting, to the at least one energy resource, the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

13. The device of claim 10, wherein:
each voltage value in the plurality of voltage values comprises a set of voltage values, each corresponding to a respective phase at the respective voltage node, and
the power value comprises a set of power values, each corresponding to a respective phase at the connection point.

14. The device of claim 13, wherein:
determining the respective value of the first voltage-constraint coefficient comprises determining a set of respective values of the first voltage-constraint coefficient, each respective value in the set of respective values of the first voltage-constraint coefficient corresponding to the respective phase at the respective voltage node;

determining the respective value of the second voltage-constraint coefficient comprises determining a set of respective values of the second voltage-constraint coefficient, each respective value in the set of respective values of the second voltage-constraint coefficient corresponding to the respective phase at the respective voltage node;

determining the value of the first power-constraint coefficient comprises determining a set of respective values of the first power-constraint coefficient, each respective value in the set of respective values of the first power-constraint coefficient corresponding to the respective phase at the connection point; and determining the value of the second power-constraint coefficient comprises determining a set of respective values of the second power-constraint coefficient, each respective value in the set of respective values of the second power-constraint coefficient corresponding to the respective phase at the connection point.

15. The device of claim 10, wherein:
determining the respective value of the first voltage-constraint coefficient comprises:
determining, based on the respective previous value of the first voltage- constraint coefficient, the minimum voltage value, and the respective voltage value in the plurality of voltage values that corresponds to the respective voltage node, a respective first voltage coefficient offset value;
scaling the respective first voltage coefficient offset value by a step size to determine a respective scaled first voltage coefficient offset value;
responsive to determining that a respective first sum of the respective previous value of the first voltage-constraint coefficient and the respective scaled first voltage coefficient offset value is greater than zero, setting the respective value of the first voltage-constraint coefficient to be the respective first sum; and
responsive to determining that the respective first sum is less than or equal to zero, setting the respective value of the first voltage-constraint coefficient to be zero, determining the respective value of the second voltage-constraint coefficient comprises:
determining, based on the respective previous value of the second voltage-constraint coefficient, the maximum voltage value, and the respective voltage value in the plurality of voltage values that corresponds to the respective voltage node, a respective second voltage coefficient offset value;
scaling the respective second voltage coefficient offset value by the step size to determine a respective scaled second voltage coefficient offset value;
responsive to determining that a respective second sum of the respective previous value of the second voltage-constraint coefficient and the respective scaled second voltage coefficient offset value is greater than zero, setting the respective value of the second voltage-constraint coefficient to be the respective second sum; and
responsive to determining that the respective second sum is less than or equal to zero, setting the respective value of the second voltage-constraint coefficient to be zero, determining the value of the first power-constraint coefficient comprises:
  determining, based on the previous value of the first power-constraint coefficient, the power setpoint for the connection point, an accuracy value, and the power value, a first power coefficient offset value;
  scaling the first power coefficient offset value by the step size to determine a scaled first power coefficient offset value; and
  responsive to determining that a third sum of the previous value of the first power-constraint coefficient and the scaled first power coefficient offset value is greater than zero, setting the value of the first power-constraint coefficient to be the third sum; and
  responsive to determining that the third sum is less than or equal to zero, setting the value of the first power-constraint coefficient to be zero, and
determining the value of the second power-constraint coefficient comprises:
  determining, based on the previous value of the second power-constraint coefficient, the power setpoint for the connection point, the accuracy value, and the power value, a second power coefficient offset value;
  scaling the second power coefficient offset value by the step size to determine a scaled second power coefficient offset value;
  responsive to determining that a fourth sum of the previous value of the second power-constraint coefficient and the scaled second power coefficient offset value is greater than zero, setting the value of the second power-constraint coefficient to be the fourth sum; and
  responsive to determining that the fourth sum is less than or equal to zero, setting the value of the second power-constraint coefficient to be zero.

16. The device of claim 10, wherein:
determining the respective value of the first voltage-constraint coefficient comprises calculating $\text{proj}_{\mathbb{R}_+}\{\lambda^{(k)}+\alpha(v^{min}-|\hat{v}^{(tk)}|-r_d\gamma^{(k)})\}$, wherein:
  $\gamma^{(k)}$ represents the previous value of the first voltage-constraint coefficient,
  $v^{min}$ represents the respective minimum voltage value for the respective voltage node,
  $\hat{v}^{(tk)}$ represents the respective voltage value that corresponds to the respective voltage node,
  $\alpha$ represents a step size, and
  $r_d$ represents a parameter indicating an importance of previous constraint coefficient values,
determining the respective value of the second voltage-constraint coefficient comprises calculating $\text{proj}_{\mathbb{R}_+}\{\mu^{(k)}+\alpha(|\hat{v}^{(tk)}|-v^{max}-r_d\mu^{(k)})\}$, wherein:
  $\mu^{(k)}$ represents the respective previous value of the second voltage-constraint coefficient, and
  $v^{max}$ represents the respective maximum voltage value for the respective voltage node,
determining the value of the first power-constraint coefficient comprises calculating $\text{proj}_{\mathbb{R}_+}\{\lambda^{(k)}+\alpha(\hat{p}_0^{(k)}-p_{0,set}^{(k)}-E^{(k)}-r_d\lambda^{(k)})\}$, wherein:
  $\lambda^{(k)}$ represents the previous value of the first power-constraint coefficient,
  $p_{0,set}^{(k)}$ represents the power setpoint for the connection point,
  $\hat{p}_0^{(k)}$ represents the power value that corresponds to the connection point, and
  $E^{(k)}$ represents an accuracy value, and
determining the value of the second power-constraint coefficient comprises calculating $\text{proj}_{\mathbb{R}_+}\{v^{(k)}+\alpha(p_{0,set}^{(k)}-\hat{p}_0^{(k)}-E^{(k)}-r_dv^{(k)})\}$, wherein:
  $v^{(k)}$ represents the previous value of the second power-constraint coefficient.

17. The device of claim 10, wherein causing the at least one energy resource to modify the output power comprises:
determining, for the at least one energy resource, a respective power setpoint value, based on the respective value of the first voltage-constraint coefficient for each respective node, the respective value of the second voltage-constraint coefficient for each respective node, the value of the first power-constraint coefficient, the value of the second power-constraint coefficient, and a respective output power value of the at least one energy resource; and
causing the at least one energy resource to modify the output power based on the respective power setpoint.

18. The device of claim 10, wherein:
the at least one energy resource comprises an aggregation of energy resources, and
causing the aggregation of energy resources to modify the output power comprises:
  determining, for the aggregation of energy resources, a respective aggregate power setpoint value, based on the respective value of the first voltage-constraint coefficient for each respective node, the respective value of the second voltage-constraint coefficient for each respective node, the value of the first power-constraint coefficient, the value of the second power-constraint coefficient, and a respective aggregate output power value of the aggregate energy resource;
  determining, based on the respective aggregate power setpoint value and a cost associated with each energy resource in the aggregation of energy resources, respective individual power setpoint values for each energy resource in the aggregation of energy resources; and
  causing each energy resource in the aggregation of energy resources to modify a respective output power based on the respective individual power setpoint values.

19. A system comprising:
a power management system configured to:
  receive a power value that corresponds to a connection point at which a first portion of a power system connects to a second portion of the power system;
  determine, for the connection point:
    a value of a first power-constraint coefficient, based on a previous value of the first power-constraint coefficient, a power setpoint for the connection point, and the power value; and
    a value of a second power-constraint coefficient, based on a previous value of the second power-constraint coefficient, the power setpoint for the connection point, and the power value; and
  output the value of the first power-constraint coefficient and the value of the second power-constraint coefficient; and a plurality of energy resource management devices, each corresponding to a respective at least one energy resource connected to the power system, each energy resource management device being configured to:
receive the value of the first power-constraint coefficient and the value of the second power-constraint coefficient;
determine, based on the value of the first power-constraint coefficient and the value of the second power-constraint coefficient, a respective power setpoint value; and
modify a respective output power of the respective at least one energy resource, based on the respective power setpoint value.

20. The system of claim 19, wherein the power management system is further configured to:
receive, from each of a plurality of current measurement devices, a respective current value that corresponds to a respective current node in a plurality of current nodes in the first portion of the power system;
determine, for each respective current node in the plurality of current nodes, a respective value of a current-constraint coefficient, based on a respective previous value of the current-constraint coefficient, a maximum current value, and the respective current value; and
output the respective value of the current-constraint coefficient for each respective current node, and
each energy resource management device is further configured to:
receive the respective value of the current-constraint coefficient for each respective current node; and
determine the respective power setpoint value based additionally on the respective value of the current-constraint coefficient for each respective current node.

21. The system of claim 19, wherein the power value comprises a set of power values, each corresponding to a respective phase at the connection point.

22. The system of claim 21, wherein:
determining the value of the first power-constraint coefficient comprises determining a set of respective values of the first power-constraint coefficient, each respective value in the set of respective values of the first power-constraint coefficient corresponding to the respective phase at the connection point; and
determining the value of the second power-constraint coefficient comprises determining a set of respective values of the second power-constraint coefficient, each respective value in the set of respective values of the second power-constraint coefficient corresponding to the respective phase at the connection point.

23. The system of claim 19, wherein a first energy resource management device in the plurality of energy resource management devices manages an aggregation of energy resources, the first energy resource management device being configured to:
determine, based on the respective power setpoint value for the first energy resource management device and a cost associated with each energy resource in the aggregation of energy resources, respective individual power setpoint values for each energy resource in the aggregation of energy resources; and
modify the respective output power of the aggregation of energy resources by modifying a respective individual output power of each energy resource in the aggregation of energy resources based on the respective individual power setpoint.

24. The system of claim 19, wherein at least one of the plurality of energy resource management devices comprises a power inverter that couples the respective at least one energy resource to the power system.

25. The system of claim 19, wherein:
determining the value of the first power-constraint coefficient comprises:
determining, based on the previous value of the first power-constraint coefficient, the power setpoint for the connection point, an accuracy value, and the power value, a first power coefficient offset value;
scaling the first power coefficient offset value by a step size to determine a scaled first power coefficient offset value; and
responsive to determining that a first sum of the previous value of the first power-constraint coefficient and the scaled first power coefficient offset value is greater than zero, setting the value of the first power-constraint coefficient to be the first sum; and
responsive to determining that the first sum is less than or equal to zero, setting the value of the first power-constraint coefficient to be zero, and determining the value of the second power-constraint coefficient comprises:
determining, based on the previous value of the second power-constraint coefficient, the power setpoint for the connection point, the accuracy value, and the power value, a second power coefficient offset value;
scaling the second power coefficient offset value by the step size to determine a scaled second power coefficient offset value;
responsive to determining that a second sum of the previous value of the second power-constraint coefficient and the scaled second power coefficient offset value is greater than zero, setting the value of the second power-constraint coefficient to be the second sum; and
responsive to determining that the second sum is less than or equal to zero, setting the value of the second power-constraint coefficient to be zero.

26. A method comprising:
receiving, by a power management system comprising at least one processor, a power value corresponding to a connection point of a first portion of a power system with a second portion of the power system;
determining, by the power management system and for the connection point:
a value of a first power-constraint coefficient, based on a previous value of the first power-constraint coefficient, a power setpoint for the connection point, and the power value; and
a value of a second power-constraint coefficient based on a previous value of the second power-constraint coefficient, the power setpoint for the connection point, and the power value; and
causing, by the power management system, at least one energy resource in a plurality of energy resources that are connected to the first portion of the power system to modify an output power of the at least one energy resource based on the value of the first power-constraint coefficient for the connection point and the value of the second power-constraint coefficient for the connection point.

27. The method of claim 26, wherein causing the at least one energy resource to modify the output power comprises outputting, to the at least one energy resource, the value of the first power-constraint coefficient for the connection point and the value of the second power-constraint coefficient for the connection point.

28. The method of claim 26, further comprising:
receiving a plurality of current values, wherein current values in the plurality of current values correspond to respective current nodes in a plurality of current nodes in the first portion of the power system;
determining, for each respective current node, a respective value of a current-constraint coefficient, based on a respective previous value of the current-constraint coefficient, a respective maximum current value for the respective current node, and a respective current value in the plurality of current values that corresponds to the respective current node, wherein
causing the at least one energy resource to modify the output power of the at least one energy resource comprises causing the at least one energy resource to modify the output power of the at least one energy resource based further on the respective value of the current-constraint coefficient for each respective current node.

29. The method of claim 26, wherein:
determining the value of the first power-constraint coefficient comprises:
determining, based on the previous value of the first power-constraint coefficient, the power setpoint for the connection point, an accuracy value, and the power value, a first power coefficient offset value;
scaling the first power coefficient offset value by a step size to determine a scaled first power coefficient offset value; and
responsive to determining that a first sum of the previous value of the first power-constraint coefficient and the scaled first power coefficient offset value is greater than zero, setting the value of the first power-constraint coefficient to be the first sum; and
responsive to determining that the first sum is less than or equal to zero, setting the value of the first power-constraint coefficient to be zero, and determining the value of the second power-constraint coefficient comprises:
determining, based on the previous value of the second power-constraint coefficient, the power setpoint for the connection point, the accuracy value, and the power value, a second power coefficient offset value;
scaling the second power coefficient offset value by the step size to determine a scaled second power coefficient offset value;
responsive to determining that a second sum of the previous value of the second power-constraint coefficient and the scaled second power coefficient offset value is greater than zero, setting the value of the second power-constraint coefficient to be the second sum; and
responsive to determining that the second sum is less than or equal to zero, setting the value of the second power-constraint coefficient to be zero.

30. The method of claim 26, further comprising:
receiving, by the power management system, a plurality of voltage values, wherein voltage values in the plurality of voltage values represent respective voltage magnitudes at respective voltage nodes in a plurality of voltage nodes in the first portion of the power system;
determining, by the power management system and for each respective voltage node:
a respective value of a first voltage-constraint coefficient, based on a respective previous value of the first voltage-constraint coefficient, a minimum voltage value, and a respective voltage value in the plurality of voltage values that corresponds to the respective voltage node; and
a respective value of a second voltage-constraint coefficient based on a respective previous value of the second voltage-constraint coefficient, a maximum voltage value, and the respective voltage value, wherein the minimum voltage value for the respective node and the maximum voltage value for the respective node represent a defined allowable voltage range at the respective node; and
causing the at least one energy resource to modify the output power of the at least one energy resource comprises causing the at least one energy resource to modify the output power of the at least one energy resource based further on the respective value of the first voltage- constraint coefficient for each respective voltage node, and the respective value of the second voltage-constraint coefficient for each respective voltage node.

31. The method of claim 30, wherein causing the at least one energy resource to modify the output power comprises outputting, to the at least one energy resource, the respective value of the first voltage-constraint coefficient for each respective voltage node, the respective value of the second voltage-constraint coefficient for each respective voltage node, the value of the first power-constraint coefficient for the connection point, and the value of the second power-constraint coefficient for the connection point.

32. The method of claim 30, further comprising:
receiving a plurality of current values, wherein current values in the plurality of current values correspond to respective current nodes in a plurality of current nodes in the first portion of the power system;
determining, for each respective current node, a respective value of a current-constraint coefficient, based on a respective previous value of the current-constraint coefficient, a respective maximum current value for the respective current node, and a respective current value in the plurality of current values that corresponds to the respective current node, wherein
causing the at least one energy resource to modify the output power of the at least one energy resource comprises causing the at least one energy resource to modify the output power of the at least one energy resource based further on the respective value of the current-constraint coefficient for each respective current node.

* * * * *